(12) United States Patent
Cao Minh et al.

(10) Patent No.: US 10,571,600 B2
(45) Date of Patent: Feb. 25, 2020

(54) DETERMINATION OF FORMATION PROPERTIES USING GRAPHICAL METHODS

(71) Applicant: Schlumberger Technology Corporation, Sugar Land, TX (US)

(72) Inventors: Chanh Cao Minh, Katy, TX (US); Kais Gzara, Tunis (TN); Roger Griffiths, Selangor (MY)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 176 days.

(21) Appl. No.: 15/026,496

(22) PCT Filed: Sep. 29, 2014

(86) PCT No.: PCT/US2014/058128
§ 371 (c)(1),
(2) Date: Mar. 31, 2016

(87) PCT Pub. No.: WO2015/050825
PCT Pub. Date: Sep. 9, 2015

(65) Prior Publication Data
US 2016/0238739 A1    Aug. 18, 2016

Related U.S. Application Data

(60) Provisional application No. 61/886,501, filed on Oct. 3, 2013, provisional application No. 61/887,097, filed on Oct. 4, 2013.

(51) Int. Cl.
*G01V 11/00* (2006.01)
*E21B 47/12* (2012.01)

(52) U.S. Cl.
CPC ............ *G01V 11/002* (2013.01); *E21B 47/12* (2013.01)

(58) Field of Classification Search
CPC ........ G01V 11/00; G01V 11/002; E21B 47/12
See application file for complete search history.

(56) References Cited

U.S. PATENT DOCUMENTS

| 4,617,825 A | 10/1986 | Ruhovets |
| 4,899,112 A | 2/1990 | Clark et al. |
| 4,916,616 A * | 4/1990 | Freedman ............... E21B 49/00 324/351 |

(Continued)

FOREIGN PATENT DOCUMENTS

| WO | 2015048618 A1 | 4/2015 |
| WO | 2015050825 A1 | 4/2015 |

OTHER PUBLICATIONS

Wikipedia, the free encyclopedia, Shale, Jan. 4, 2012.*

(Continued)

*Primary Examiner* — Kyle R Quigley

(57) ABSTRACT

A method for estimation of water properties and hydrocarbon properties in a subsurface formation include acquiring a plurality of well log measurements from the subsurface formation. The water properties and the formation properties are parameterized with respect to a selected set of well log measurements. The parameterized water properties, the parameterized formation properties and the well log measurements are graphically displayed to estimate the water properties.

20 Claims, 20 Drawing Sheets

(56) References Cited

U.S. PATENT DOCUMENTS

| | | |
|---|---|---|
| 8,441,269 B2 | 5/2013 | Minh et al. |
| 2008/0114547 A1 | 5/2008 | Syngaevsky |
| 2010/0228485 A1* | 9/2010 | Betancourt ............ G01V 11/00 702/13 |
| 2010/0283490 A1* | 11/2010 | Minh ..................... G01V 11/00 324/694 |
| 2011/0068788 A1* | 3/2011 | Minh ....................... G01V 3/18 324/303 |
| 2011/0204217 A1 | 8/2011 | Oraby et al. |
| 2012/0192640 A1* | 8/2012 | Minh ........................ E21B 7/06 73/152.16 |
| 2013/0085675 A1 | 4/2013 | Prakash et al. |

OTHER PUBLICATIONS

International Search Report and the Written Opinion for International Application No. PCT/US2014/058128 dated Jan. 15, 2015.

\* cited by examiner

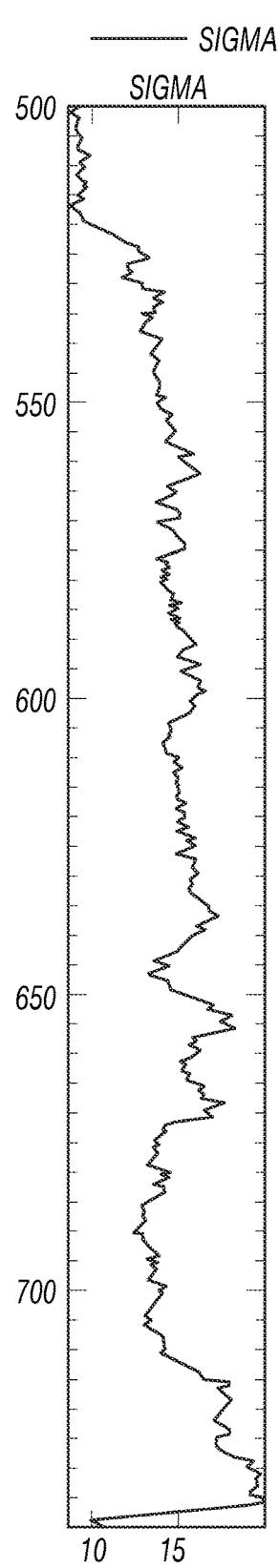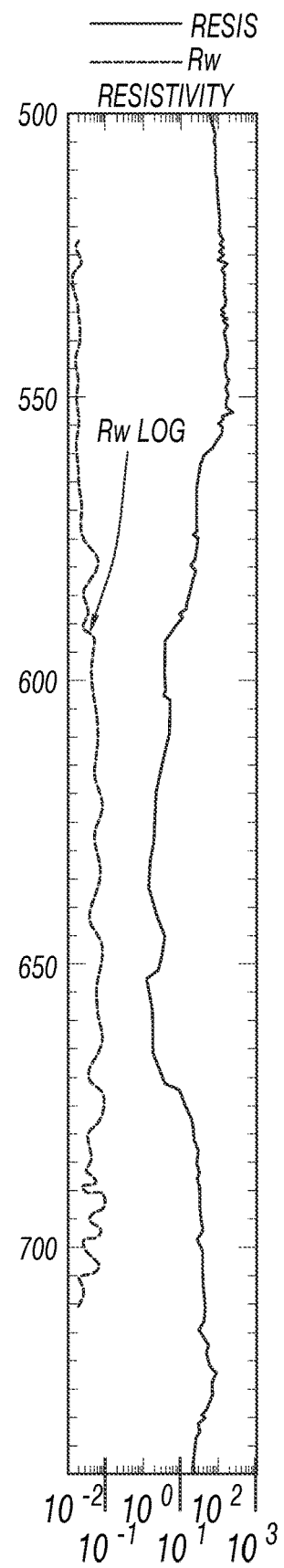
FIG. 5C
FIG. 5D

DETERMINATION OF FORMATION PROPERTIES USING GRAPHICAL METHODS

CROSS-REFERENCE TO RELATED APPLICATIONS

This application claims priority to U.S. Provisional Patent Application Ser. No. 61/886,501, which was filed on Oct. 3, 2013 and to U.S. Provisional Patent Application Ser. No. 61/887,097, which was filed Oct. 4, 2013. The entirety of this provisional application is incorporated herein by reference.

BACKGROUND

The present disclosure relates generally to the logging of subsurface formations surrounding a wellbore using one or more well logging instruments, and particularly to making disparate measurements with the one or more instruments while drilling and using those disparate measurements to infer one or more formation properties. More specifically, the present disclosure relates to techniques for determining formation properties through solving combined well logs using graphical methods, such as Sigma-resistivity logs.

Well logging instruments have long been used in wellbores to make, for example, formation evaluation measurements to infer properties of the formations surrounding the wellbore such as the mineral composition and fractional volume of pore space ("porosity") as well as properties of fluids in porous formations. Well logging instruments known in the art include electromagnetic tools, nuclear tools, and nuclear magnetic resonance (NMR) tools, though various other types of tools are also used.

Early logging instruments were run into a wellbore on an armored electrical cable ("wireline") after the wellbore had been drilled. Modern versions of such wireline instruments are still used extensively. However, the need for information while drilling the wellbore gave rise to measurement-while-drilling (MWD) tools and logging-while-drilling (LWD) tools. MWD tools typically provide measurements of drilling parameters such as weight on the bit, torque, temperature, pressure, wellbore geodetic or geomagnetic direction, and wellbore inclination. LWD tools typically provide formation evaluation measurements such as resistivity, porosity, and NMR distributions (e.g., T1 and T2). MWD and LWD tools may have sensing components in common with wireline tools (e.g., transmitting and receiving antennas), but MWD and LWD tools must be constructed to operate in the harsh environment of drilling, frequently for extended periods of time.

Some logging instruments may be combined to different types of formation measurements in a single "pass" or "run" of well logging instruments through the wellbore. By way of example, a combined instrument may be capable of measuring formation total porosity ($\Phi$), thermal neutron capture cross section ($\Sigma$) and electrical resistivity (R) simultaneously. For example, a combination instrument may be one sold under the trademark ECOSCOPE, which is a trademark of Schlumberger Technology Corporation, Sugar Land, Tex. The inclusion of a plurality of different sensors on a combination logging instrument allows the measurements to be made in substantially in the same formation zone of investigation and substantially at the same time.

Sometimes, specific multiple measurement instrument are combined to enable determining certain formation parameters from the particular combination. For example, Sigma (S) and resistivity (R) measurements may be combined to compute $S_w$, and $R_w$, curves (where the subscript "w" denotes formation water) using numerical techniques to obtain $S_w$ and $R_w$ that are consistent with the measurements. Examples of such numerical techniques are described U.S. Pat. No. 8,441,269 issued to Minh et al. However, it would be useful to provide a graphical method for determining formation parameters from multiple types of well log measurements, with the graphical method being available for use instead of or in addition to existing numerical methods.

SUMMARY

A summary of certain embodiments disclosed herein is set forth below. It should be understood that these aspects are presented merely to provide the reader with a brief summary of certain embodiments and that these aspects are not intended to limit the scope of this disclosure. Indeed, this disclosure may encompass a variety of aspects that may not be set forth in this section.

Embodiments set forth in this disclosure provide techniques in which multiple measurement logs are combined to graphically solve for certain formation parameters. For example, Sigma ($\Sigma$) and resistivity (R) logs may be combined to compute $S_w$ and $R_w$ curves (where the subscript "w" denotes formation water) using numerical techniques to obtain $S_w$ and $R_w$ that are consistent with the measurements. The graphical methods may be available for use instead of or in addition to numerical methods.

A method for estimation of water properties and hydrocarbon properties in a subsurface formation is disclosed. The method includes acquiring well log measurements from the subsurface formation, parameterizing the water properties and the formation properties with respect to a selected set of well log measurements, and graphically displaying the parameterized water properties, the parameterized formation properties and the well log measurements to estimate the water properties.

A system for characterizing subsurface formation fluid content is also disclosed. The system includes well logging sensors that each measure a different physical parameter of the subsurface formation at multiple depths of investigation from a wall of the a wellbore, a predetermined set of values of response of each of the well logging sensors to water having multiple values of salinity and formation lithologies having known response to selected well log measurements, and means for graphically displaying the parameterized water properties, the formation properties and the well log measurements to estimate the water properties.

Again, the brief summary presented above is intended to familiarize the reader with certain aspects and contexts of embodiments of the present disclosure without limitation to the claimed subject matter.

BRIEF DESCRIPTION OF THE DRAWINGS

FIGS. 5A-5G are output logs of gamma ray (5A), porosity (5B), water thermal neutron capture cross section (5C), water resistivity (5D), water saturation from water resistivity (5E), water saturation from water capture cross section (5F), and salinity (5G), in accordance with one embodiment in the present disclosure.

DETAILED DESCRIPTION

One or more specific embodiments of the present disclosure are described below. These embodiments are merely examples of the presently disclosed techniques and are not to be construed as limits on the scope of the present disclosure. Additionally, in an effort to provide a concise description of these embodiments, all features of an actual implementation may not be described. It should be appreciated that in the development of any such implementation, as in any engineering or design project, numerous implementation-specific decisions are made to achieve the designer's specific goals, such as compliance with system-related and business-related constraints, which may vary from one implementation to another. Moreover, it should be appreciated that such development efforts might be complex and time consuming, but would nevertheless be a routine undertaking of design, fabrication, and manufacture for those of ordinary skill having the benefit of the present disclosure.

When introducing elements of various embodiments of the present disclosure, the articles "a," "an," and "the" are intended to mean that there are one or more of the elements. The embodiments discussed below are intended to be examples that are illustrative in nature and should not be construed to mean that the specific embodiments described herein are necessarily preferential in nature. Additionally, it should be understood that references to "one embodiment" or "an embodiment" within the present disclosure are not to be interpreted as excluding the existence of additional embodiments that also incorporate the recited features.

Figure 1:
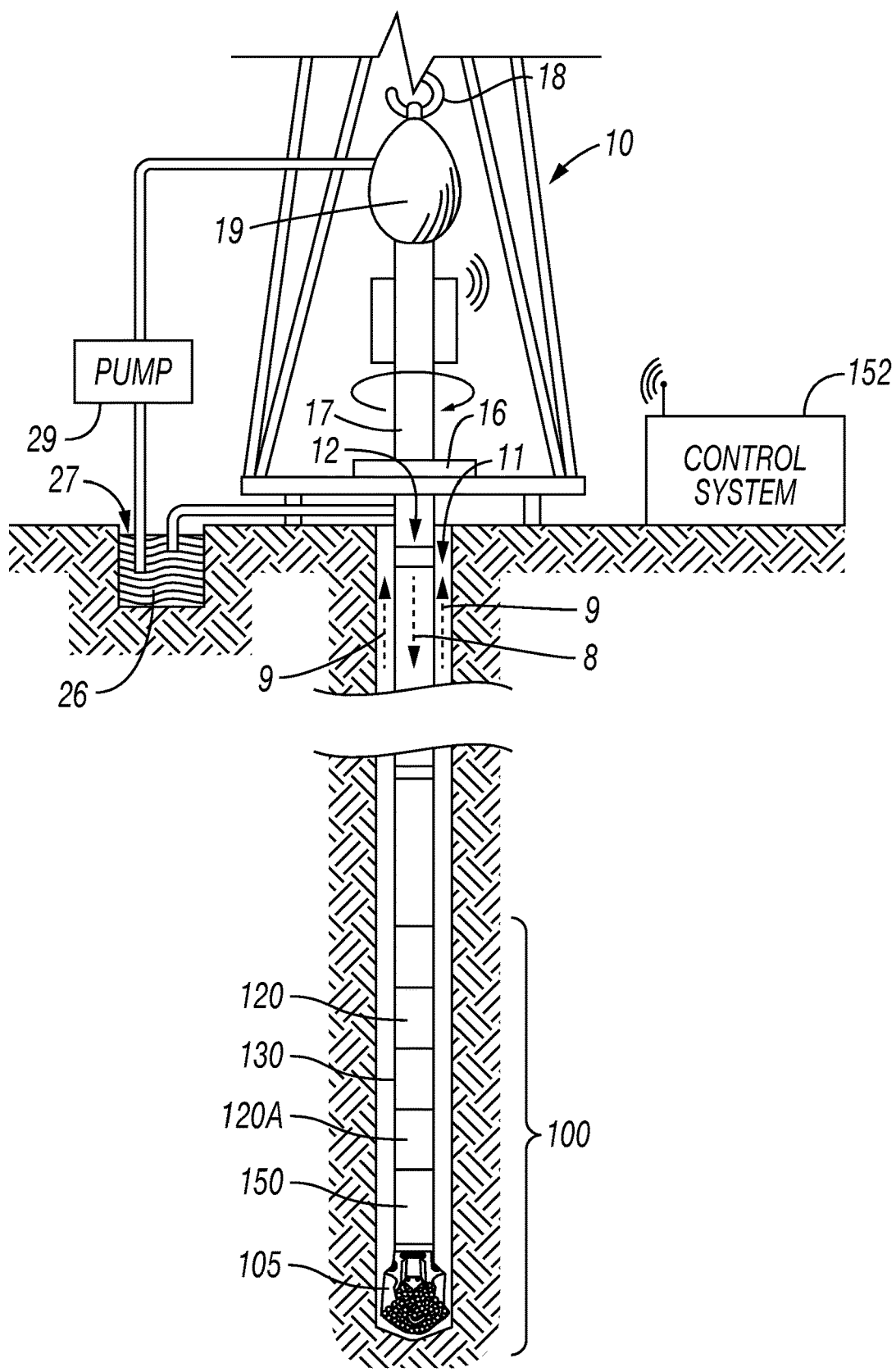
FIG. 1 is an example of a wellsite system that may be used for implementation of an example embodiment.

FIG. 1 represents a simplified view of a well site system in which various embodiments may be used. The well site system depicted in FIG. 1 may be deployed in either onshore or offshore applications. In this type of system, a wellbore 11 is formed in subsurface formations by rotary drilling in a manner that is well known to those skilled in the art. Some embodiments may also use directional drilling to change the trajectory of the wellbore from vertical as shown in FIG. 1 and are thus within the scope of the present disclosure A drill string 12 is suspended within the wellbore 11 and has a bottom hole assembly (BHA) 100 which includes a drill bit 105 at its lower end. The surface system includes a platform and derrick assembly 10 positioned over the wellbore 11, with the assembly 10 including a rotary table 16, kelly 17, hook 18 and rotary swivel 19. In a drilling operation, the drill string 12 is rotated by the rotary table 16 (energized by means not shown), which engages the kelly 17 at the upper end of the drill string. The drill string 12 is suspended from a hook 18, attached to a traveling block (also not shown), through the kelly 17 and a rotary swivel 19 which permits rotation of the drill string 12 relative to the hook 18. As is known in the art, a top drive system (not shown) may be used in other embodiments in substitution of the kelly 17, rotary table 16 and rotary swivel 19.

Drilling fluid or mud 26 may be stored in a tank or pit 27 formed or disposed at the well site. A pump 29 delivers the drilling fluid 26 to the interior of the drill string 12 via a port in the swivel 19, which causes the drilling fluid 26 to flow downwardly through the drill string 12, as indicated by the directional arrow 8 in FIG. 1. The drilling fluid exits the drill string 12 via ports (not shown separately) in the drill bit 105, and then circulates upwardly through an annular space ("annulus") between the outside of the drill string 12 and the wall of the wellbore, as indicated by the directional arrows 9. In this manner, the drilling fluid cools and lubricates the drill bit 105 and carries formation cuttings up to the surface as it is returned to the pit 27 for recirculation.

The drill string 12 may include a BHA 100. In the illustrated embodiment, the BHA 100 is shown as having one MWD module 130 and multiple LWD modules 120 (with reference number 120A depicting a second LWD module 120). As used herein, the term "module" as applied to MWD and LWD devices is understood to mean either a single tool or a plurality of tools contained in a single modular device. Additionally, the BHA 100 may include a rotary steerable directional drilling system (RSS—not shown) and an hydraulically operated drilling motor 150.

The LWD modules 120 may each be housed in a drill collar and may include one or more types of well logging tools. The LWD modules 120 may include instruments for measuring, processing, and storing information, as well as for communicating with the surface equipment. By way of example, the LWD module 120 may include an instrument that makes resistivity measurements, nuclear measurements, NMR measurements, acoustic measurements, dielectric measurements, among other non-limiting examples. In some embodiments, the LWD module 120 may include a combined tool capable of making two or more measurement types, such as resistivity and Sigma measurements.

The MWD module 130 may also be housed in a drill collar, and may contain one or more devices for measuring characteristics of the drill string and drill bit. In the present embodiment, the MWD module 130 may include one or more of the following types of measuring devices: a weight-on-bit measuring device, a torque measuring device, a vibration measuring device, a shock measuring device (e.g., in the form of one or more accelerometers), a stick/slip measuring device, an instrument geodetic and/or geomagnetic direction measuring device, and an inclination measuring device (the latter two sometimes being referred to collectively as a "D&I package"). The MWD tool 130 may further include an apparatus (not shown) for generating electrical power for any or all of the foregoing described devices. For example, power generated by the MWD tool 130 may be used to power the MWD tool 130 and the LWD tool(s) 120. In some embodiments, this apparatus may include a mud turbine generator powered by the flow of the drilling fluid 26. It is understood, however, that other power and/or battery systems may be employed.

The operation of the assembly 10 of FIG. 1 may be controlled using a control system 152 located at the surface. The control system 152 may include one or more processor-based computing systems. In the present context, a processor may include a microprocessor, programmable logic devices (PLDs), field-gate programmable arrays (FPGAs), application-specific integrated circuits (ASICs), system-on-a-chip processors (SoCs), or any other suitable integrated circuit capable of executing encoded instructions stored, for example, on tangible computer-readable media (e.g., read-only memory, random access memory, a hard drive, optical disk, flash memory, etc.). Such instructions may correspond to, for instance, workflows and the like for carrying out a drilling operation, algorithms and routines for processing data received at the surface from the BHA 100 (e.g., as part of an inversion to obtain one or more desired formation parameters), and so forth.

Figure 2:
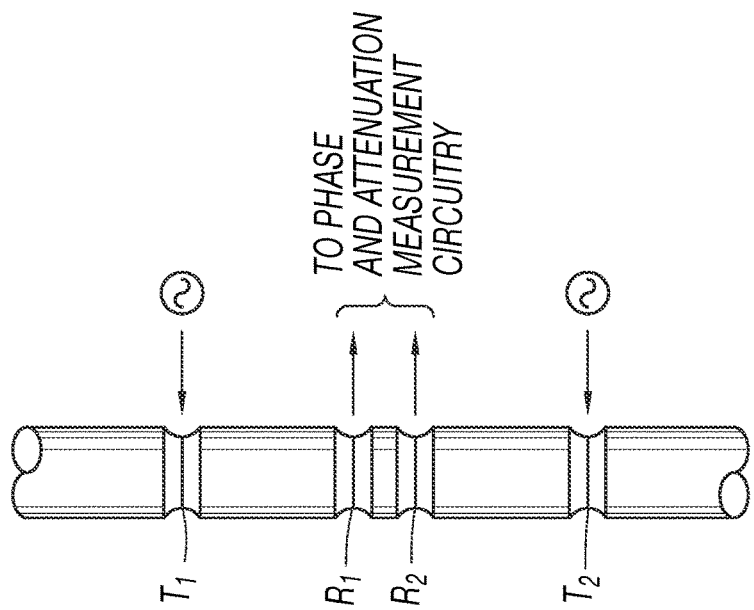
FIG. 2 shows an example of an electromagnetic logging tool.

An example of an instrument which can be the LWD tool 120, or can be a part of an LWD tool suite 120A of the system and method hereof, is the dual resistivity LWD tool disclosed in U.S. Pat. No. 4,899,112 and entitled "Well Logging Apparatus And Method For Determining formation Resistivity At A Shallow And A Deep Depth." As may be observed in FIG. 2, such an instrument may include upper and lower transmitting antennas, $T_1$ and $T_2$, and upper and lower receiving antennas, $R_1$ and $R_2$, therebetween. The antennas may be formed in recesses in a modified drill collar and mounted in insulating material. The phase shift of detected electromagnetic energy from each of the transmitters $T_1$, $T_2$ as between the receivers $R_1$, $R_2$ provides an indication of formation resistivity at a relatively shallow lateral depth of investigation (distance from the wellbore wall), and the attenuation of electromagnetic energy as between the receivers provides an indication of formation resistivity at a relatively deep depth of investigation. The above-referenced U.S. Pat. No. 4,899,112 can be referred to for further details. In operation, attenuation-representative signals and phase-representative signals are communicated to a processor, an output of which may be in signal communication with a telemetry circuit.

More recent versions of such electromagnetic well logging instruments use one or more tilted or transverse antennas, with or without axial antennas. Such antennas may be transmitters or receivers. A tilted antenna is one whose dipole moment is neither parallel nor perpendicular to the longitudinal axis of the instrument. A transverse antenna is one whose dipole moment is perpendicular to the longitudinal axis of the instrument, and an axial antenna is one whose dipole moment is parallel to the longitudinal axis of the instrument. Two antennas are said to have equal angles if their dipole moment vectors intersect the instrument longitudinal axis at the same angle. For example, two tilted antennas have the same tilt angle if their dipole moment vectors, having their tails conceptually fixed to a point on the tool's longitudinal axis, lie on the surface of a right circular cone centered on the tool's longitudinal axis and having its vertex at that reference point. Transverse antennas have equal angles of 90 degrees, and that is true regardless of the particular azimuthal orientation relative to the instrument.

As stated above, at least one modern while-drilling logging tool is capable of making simultaneous, disparate measurements in one or more zones of interest in a subsurface formation. For example, such disparate measurements may include the formation total porosity (Ø), the thermal neutron capture cross section (Σ or Sigma), and the resistivity (R). The location of sensors on the instrument allows the measurements to be taken substantially in the same formation zone of investigation and substantially at the same time. A downhole assembly of instruments, as opposed to a single, integrated instrument, may also be used if it is capable of making substantially simultaneous, disparate measurements in one or more zones of interest in a subsurface formation. The single, integrated instrument or the assembly of instruments may be moved along the wellbore on a wireline, a drill string (as shown in FIG. 1), or any other conveyance mechanism known in the art, including, without limitation, coiled tubing, production tubing and slickline.

Using the above described measurements, one may solve certain equations (e.g., Sigma and Resistivity) simultaneously to obtain, for example, estimates of water salinity and saturation (fractional volume of rock pore space occupied by the water) that are mutually consistent with the measurements. In another embodiment, one may generate and display the solution graphically. For the example given, if invasion (i.e., infiltration of the liquid phase of the drilling fluid into the formation) is negligible, the results are representative of the formation unaltered by the fluid properties of the liquid phase of the drilling fluid.

Water saturation ($S_w$) interpretations from stand-alone Sigma and resistivity computations rely on, among other presumably known inputs, a water salinity input to derive Sigma water ($\Sigma_w$), and a water resistivity ($R_w$). The Sigma equation can be written as:

$$\Sigma = \Sigma_m(1-\Phi_t) + \Phi S_w \Sigma_w + \Phi_t(1-S_w)\Sigma_{hc} \qquad (1)$$

where $\Sigma_m$, $\Sigma_w$ and $\Sigma_{hc}$ are Sigma of the formation rock minerals (matrix), formation water, and hydrocarbon in the rock pore space, respectively. The resistivity may be given by Archie's equation:

$$S_w{}^n = R_w/(\Phi^m R) \qquad (2)$$

where m and n are cementation and saturation exponents, respectively, and $R_w$, is the resistivity of the formation connate water.

In this example, a clean (non-shaly) formation is used for illustration purposes only. Extension to shaly formations may be performed using well known shaly sand interpretation techniques. Both $\Sigma_w$ and $R_w$ are functions of the salinity ppm and temperature t, and $\Sigma_w$ is also a function of pressure p. These may be represented as:

$$\Sigma_w = f(\text{ppm}, t, p)$$

$$R_w = g(\text{ppm}, t) \qquad (3)$$

Figure 4:
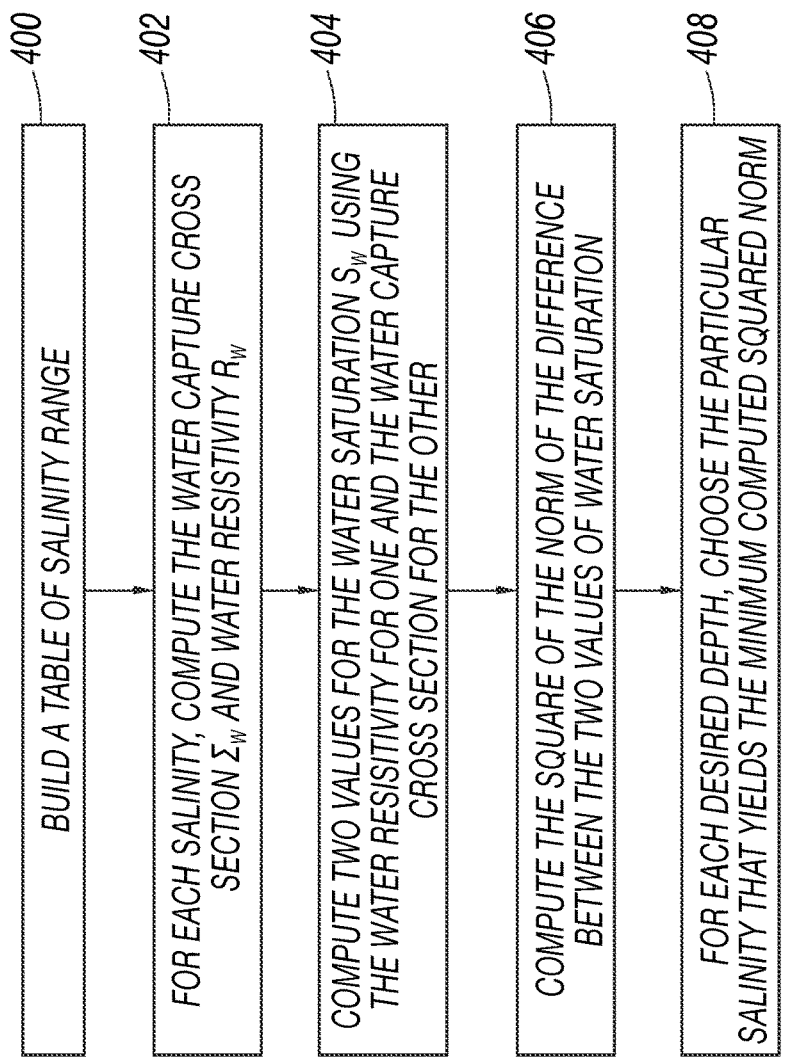
FIG. 4 is a flowchart showing an example embodiment to numerically determine the salinity of a formation fluid, in accordance with one embodiment in the present disclosure.
Figure 3A:
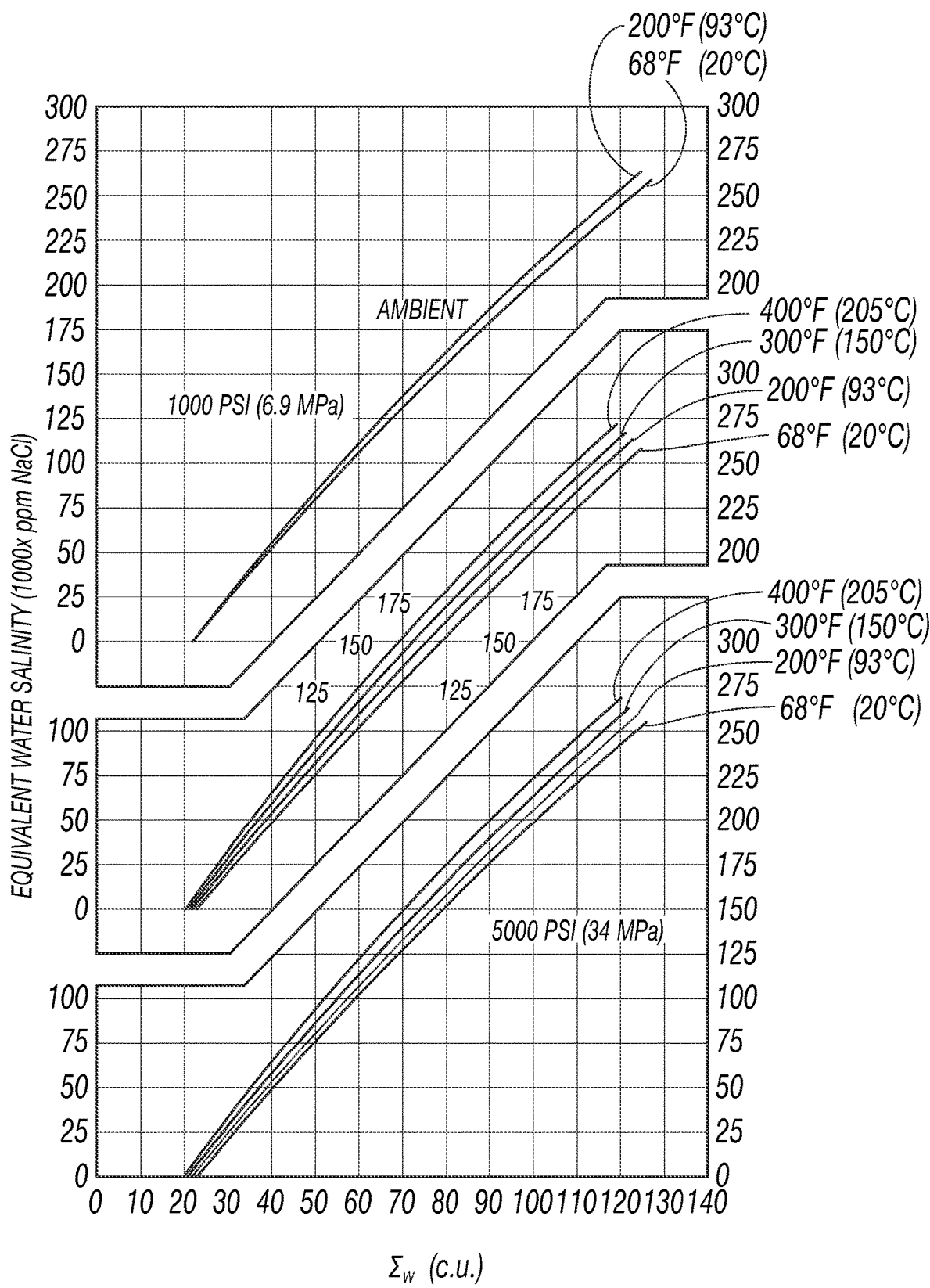
FIGS. 3A and 3B show example plots of the water capture cross section (3A) and resistivity (3B) as functions of salinity, pressure, and temperature, in accordance with one embodiment in the present disclosure.
Figure 3B:
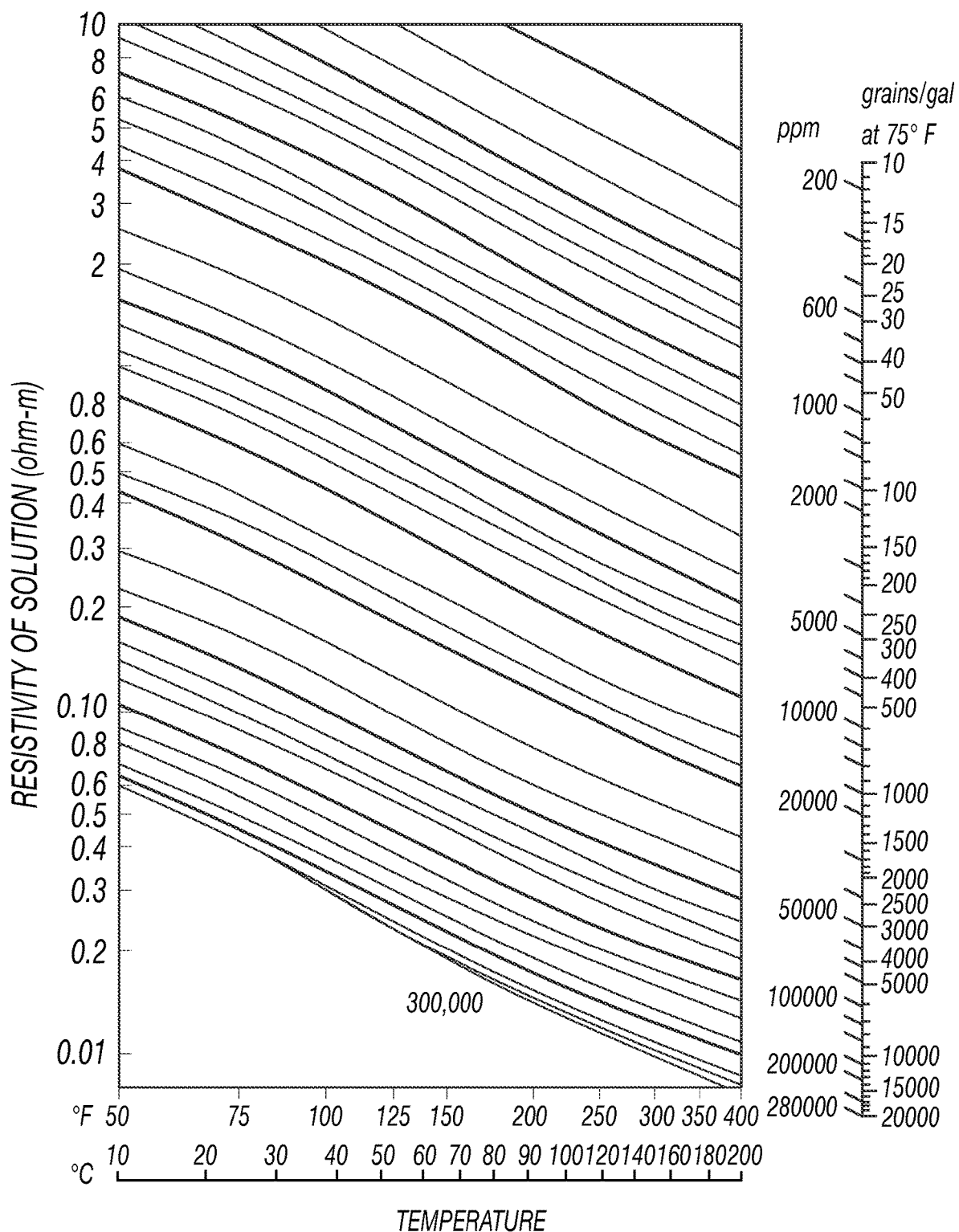

Specific examples of particular functional relationships are shown graphically in FIGS. 3A and 3B, respectively. Assuming that both the resistivity and the Sigma logs read the same formation at the same time, a numerical technique to simultaneously solve equations 1, 2, and 3 is described below and illustrated in FIG. 4.

In one embodiment, a first step is to build a table of salinity range (at 400). For each value of salinity, the water thermal neutron capture cross section $\Sigma_w$ and water resistivity $R_w$ may be computed using equation 3 (at 402). The water saturation is computed from the water resistivity using equation 2 and from the water capture cross section using equation 1 (at 404). The square of the norm of the difference between the water saturation computed from the water resistivity and the water saturation computed from the water thermal neutron capture cross section is computed (at 406), and the solution may be deemed to be the particular salinity that yields the minimum computed squared norm (at 408). The foregoing process may be referred to for purposes of the present description as parameterizing the water properties because values of he water thermal neutron capture cross section $\Sigma_w$ and water resistivity $R_w$ may be computed for each value of water salinity. As will be further explained below, the parameterized values may be graphically displayed to enable determining values of water properties from the well log measurements.

Figure 5A:
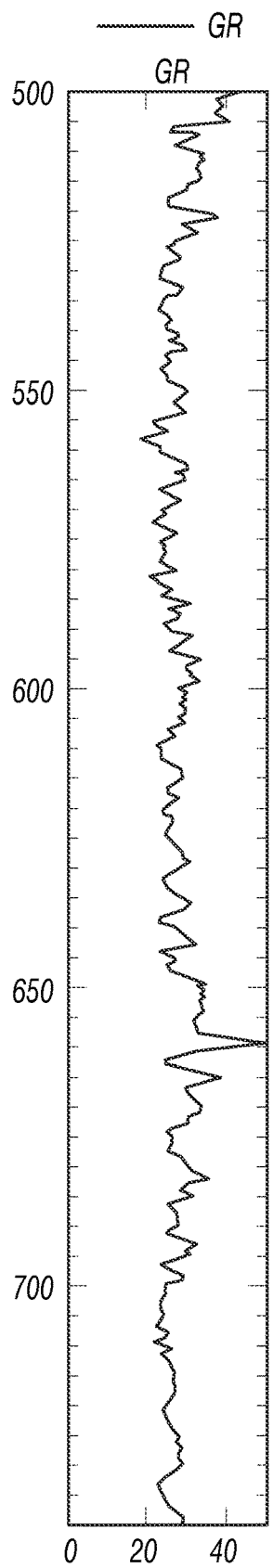
Figure 5B:
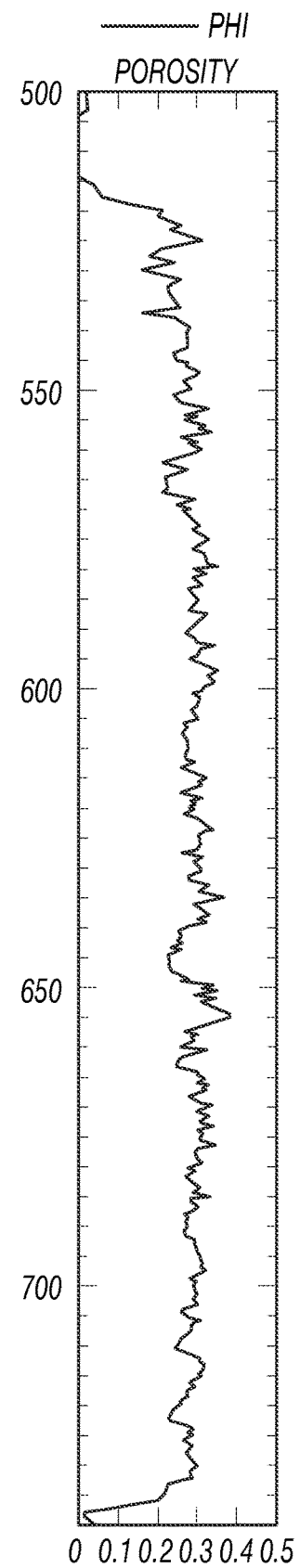
Figure 5E:
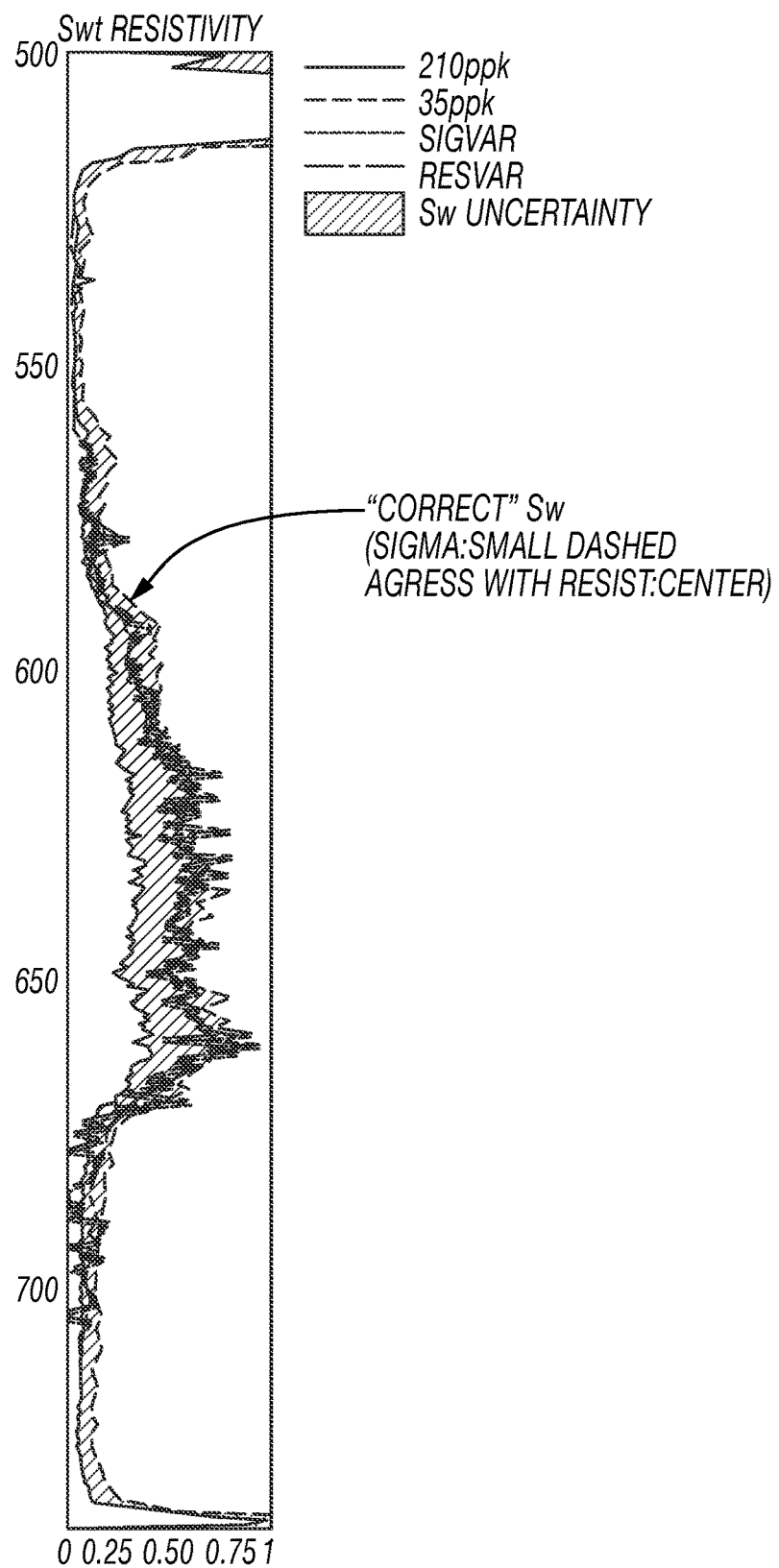
Figure 5F:
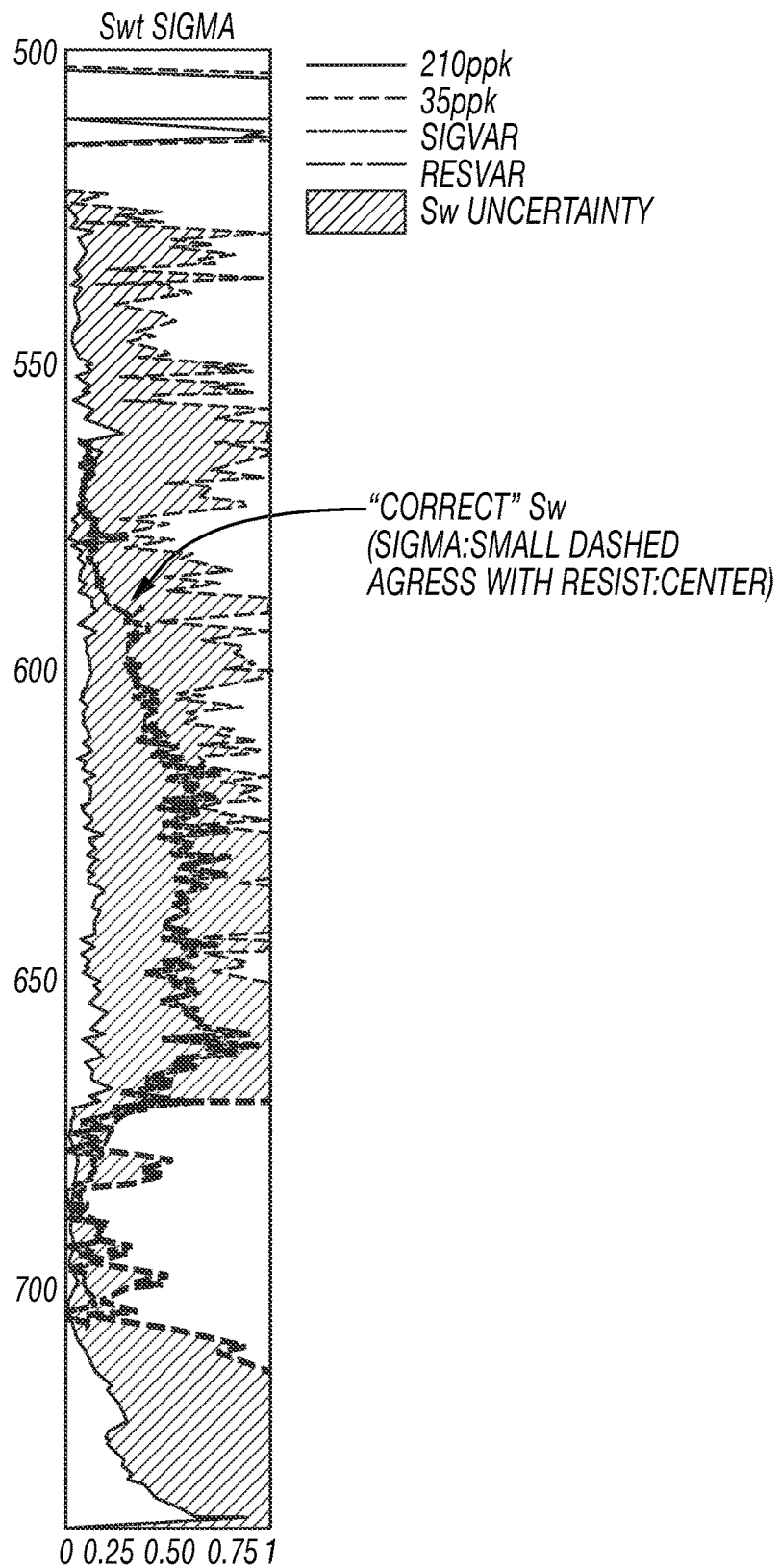
Figure 5G:
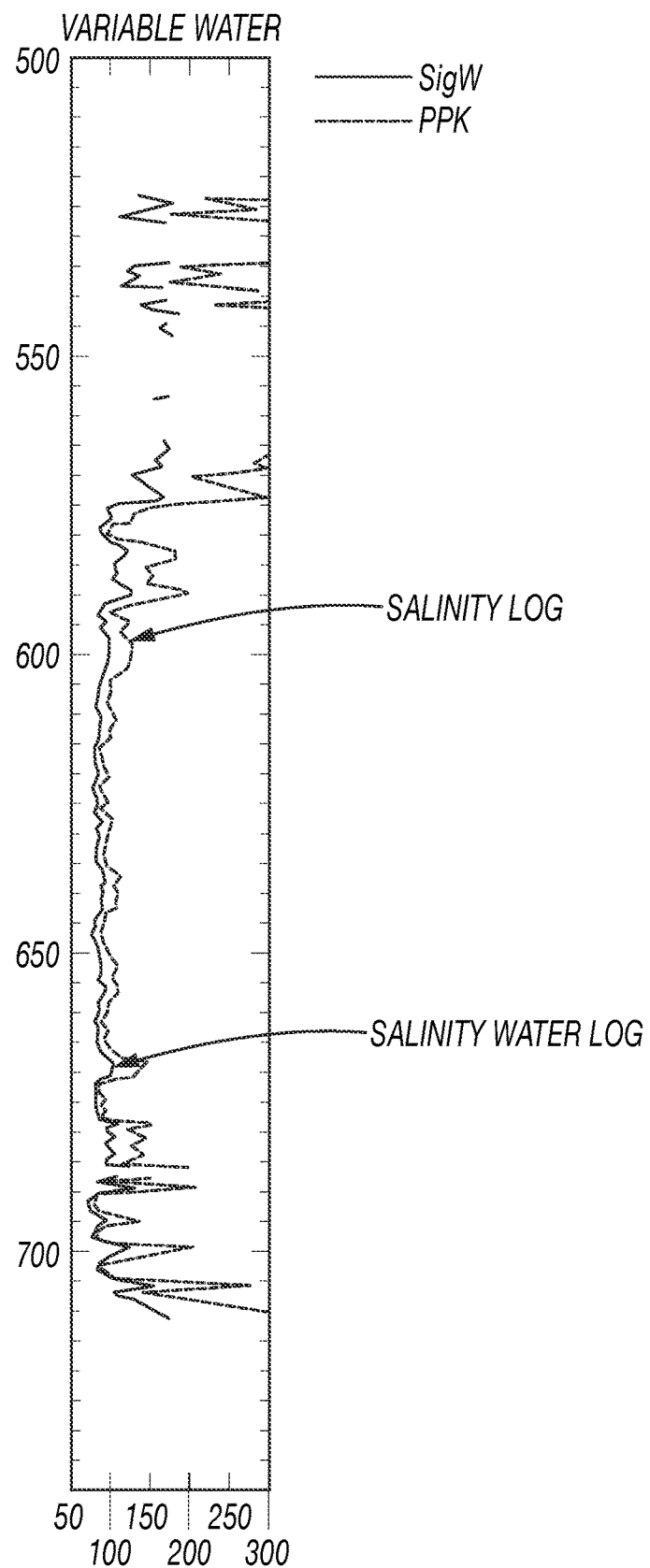

Using the foregoing process, equations 1, 2, and 3 may be simultaneously solved numerically. The input parameters are porosity, the matrix thermal neutron capture cross section, the hydrocarbon capture cross section, and an Archie saturation model with its relevant parameters (but no water parameter is needed). FIGS. 5A-5G show example output logs for gamma ray (FIG. 5A), porosity (FIG. 5B), water thermal neutron capture cross section (FIG. 5C), water resistivity (FIG. 5D), water saturation from water resistivity (FIG. 5E), water saturation from water thermal neutron capture cross section (FIG. 5F), and water salinity (FIG. 5G).

Figure 6:
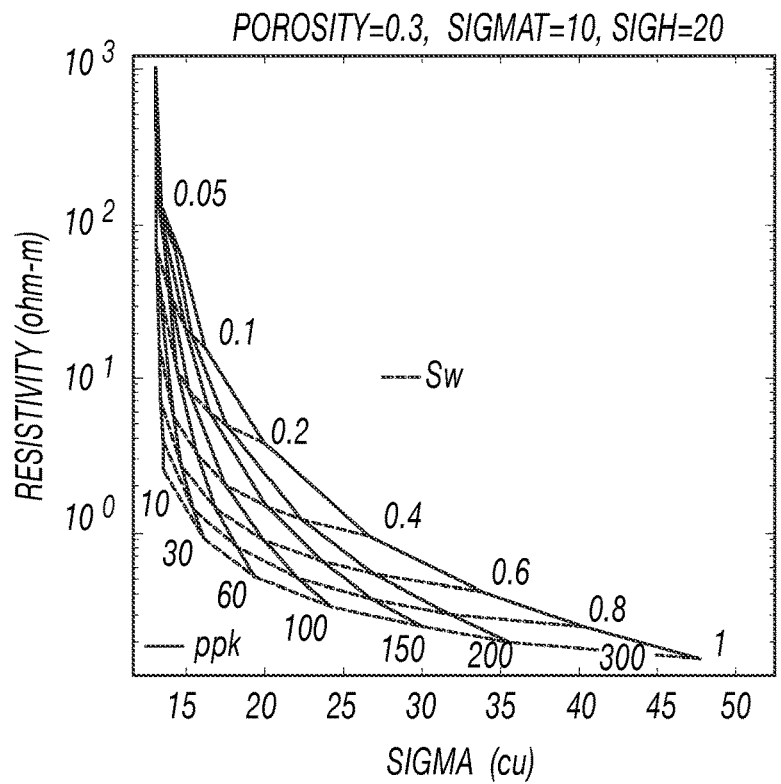
FIG. 6 is a crossplot of water capture cross section and resistivity, in accordance with one embodiment in the present disclosure.
Figure 7:
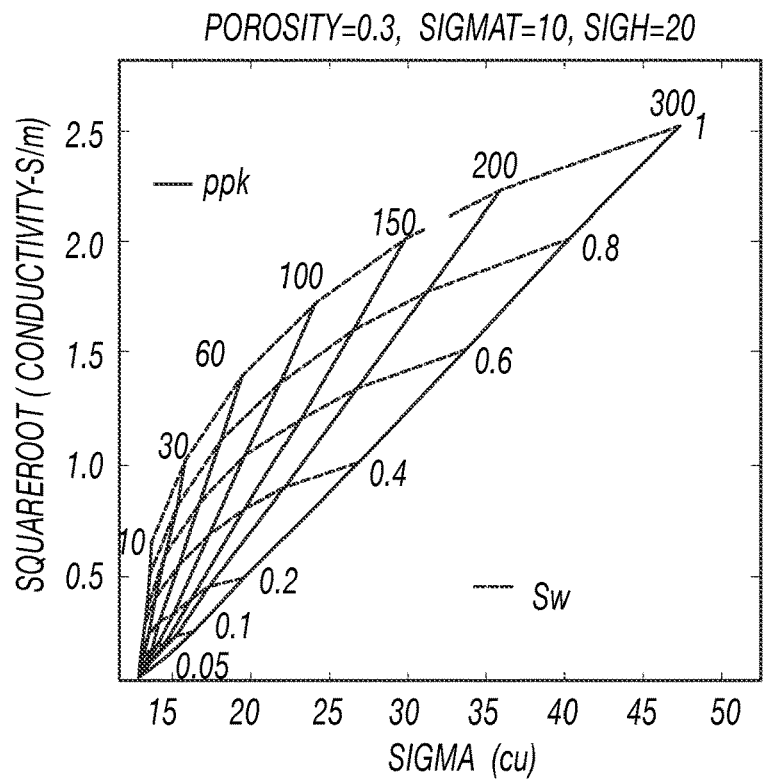
FIG. 7 is a crossplot of water capture cross section and the square root of the conductivity, as published by Clavier et al 1971.

One possible graphical output or solution is a dynamic crossplot of Sigma with respect to Resistivity (FIG. 6), whereby the crossplot overlay changes with porosity, matrix, and fluid properties. The overlay may be a grid of equi-salinity and equi-saturation lines. Other measurements such as gamma gamma-density, neutron hydrogen index and elemental spectroscopy (e.g., inelastic neutron gamma ray spectroscopy) may be used to estimate the porosity and matrix endpoints. The foregoing may be referred to for purposes of the present description as parameterizing the formation properties. One aspect of the dynamic Sigma-Resistivity crossplot is that it contains both forward and inverse solutions. That is, having the forward solution means that from salinity, saturation, porosity, and other formation parameters, synthetic Sigma and Resistivity logs can be produced. Having the inverse solution means that from measured Sigma and Resistivity logs and other formation parameters, water salinity and saturation are given by the crossplot overlay. Since the square root of conductivity, sqrC, (=sqr(1/R)) is proportional to the water volume, one may crossplot the equivalent Sigma versus sqrC to gain more dynamic range, as shown in FIG. 7.

A further aspect of the crossplots is that they contain the domain of data and answers from the petrophysics viewpoint. Those could be used for quality control purposes. For example, the input data could be validated. The crossplots contain or allow for more petrophysical insight than a set of equations.

Figure 8:
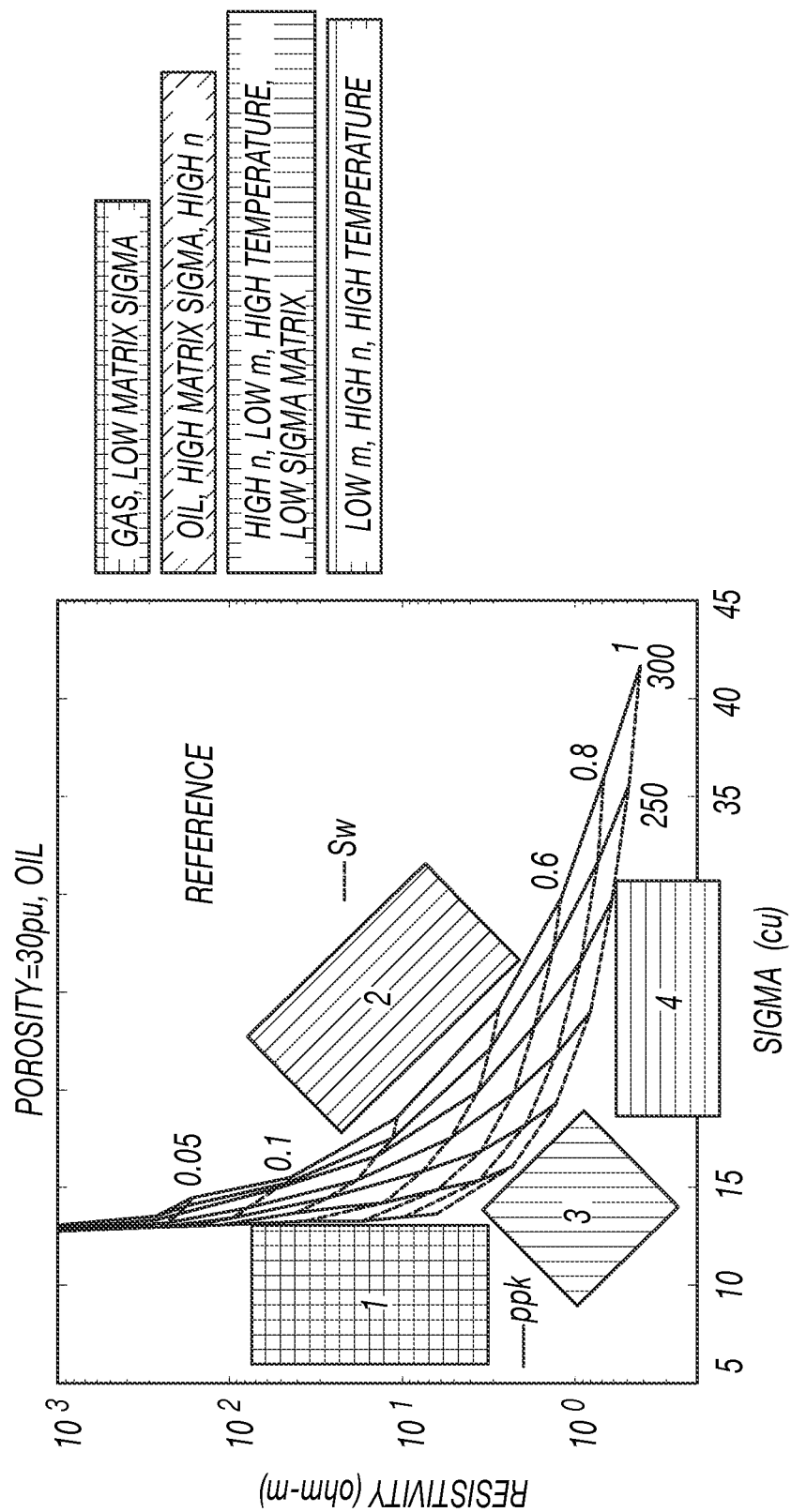
FIG. 8 is a crossplot showing how parameter sensitivity and selection can be investigated and performed, in accordance with one embodiment in the present disclosure.

The crossplots may be used to identify zones of changing properties. Having the ability to crossplot "on the fly" allows one to analyze a parameter's sensitivity and helps guide parameter selection for other (e.g., numerical) processing applications, as shown in FIG. 8. If a data point falls outside the "boomerang", depending on whether it falls in region 1, 2, 3, or 4 of the left panel in FIG. 8, the parameter's remedial is shown in the legend to the right of the graphic display in FIG. 8.

Figure 9:
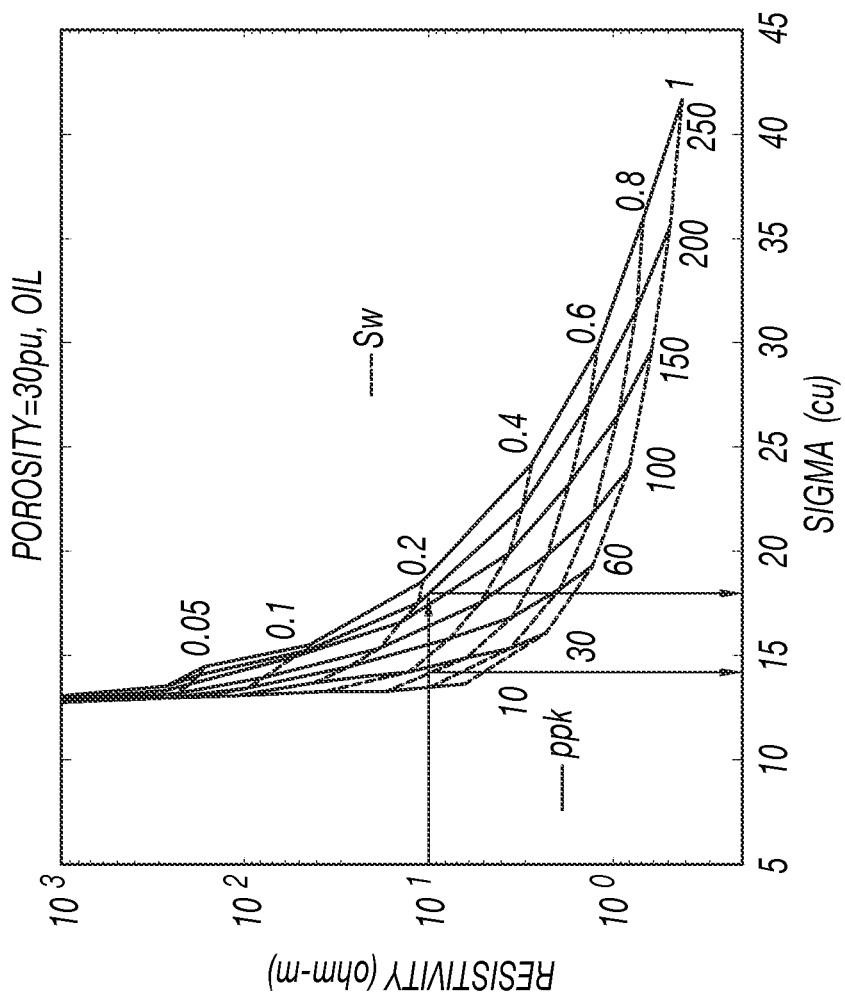
FIG. 9 is a crossplot showing how job planning may be performed, in accordance with one embodiment in the present disclosure.
Figure 11:
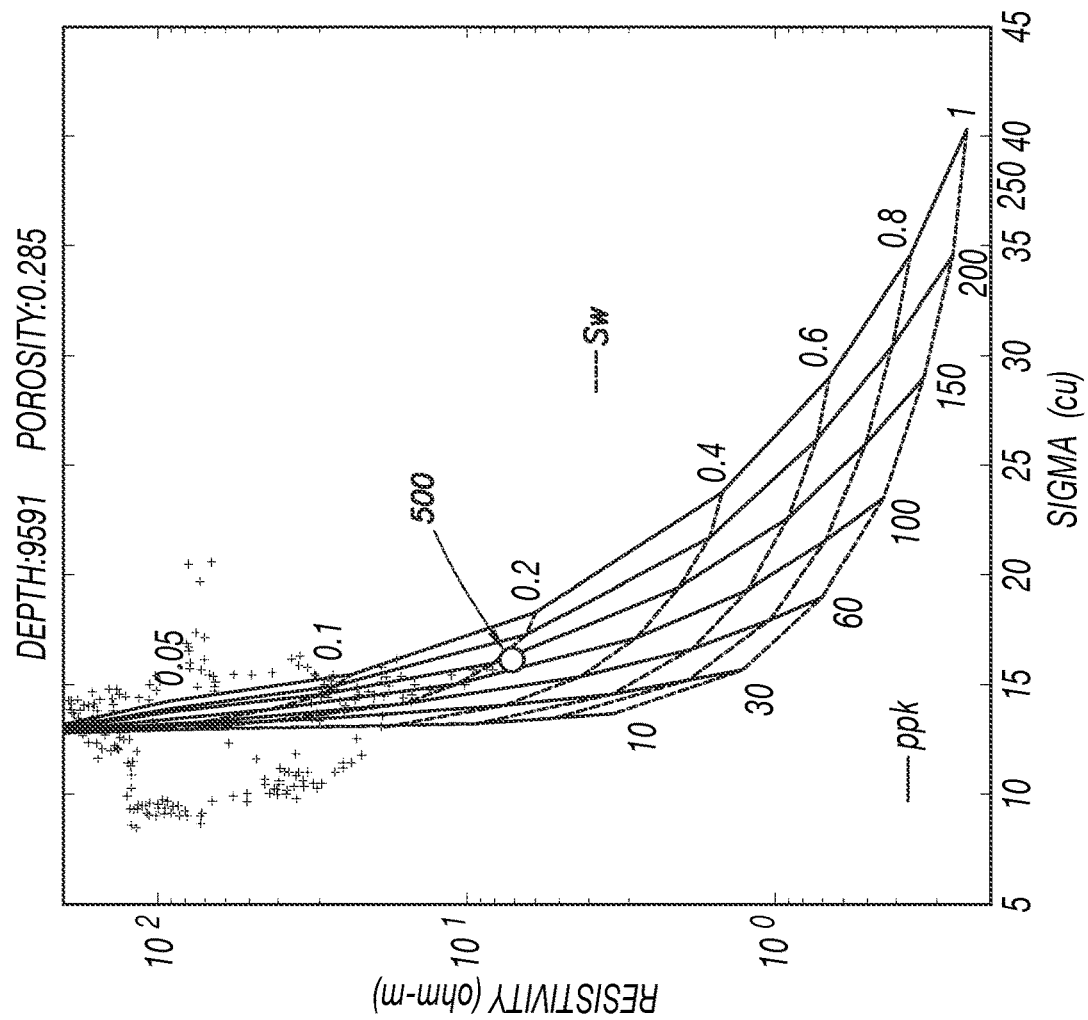
FIG. 11 is a real-time crossplot of resistivity and capture cross section showing the "current" data point, in accordance with one embodiment in the present disclosure.
Figure 10:
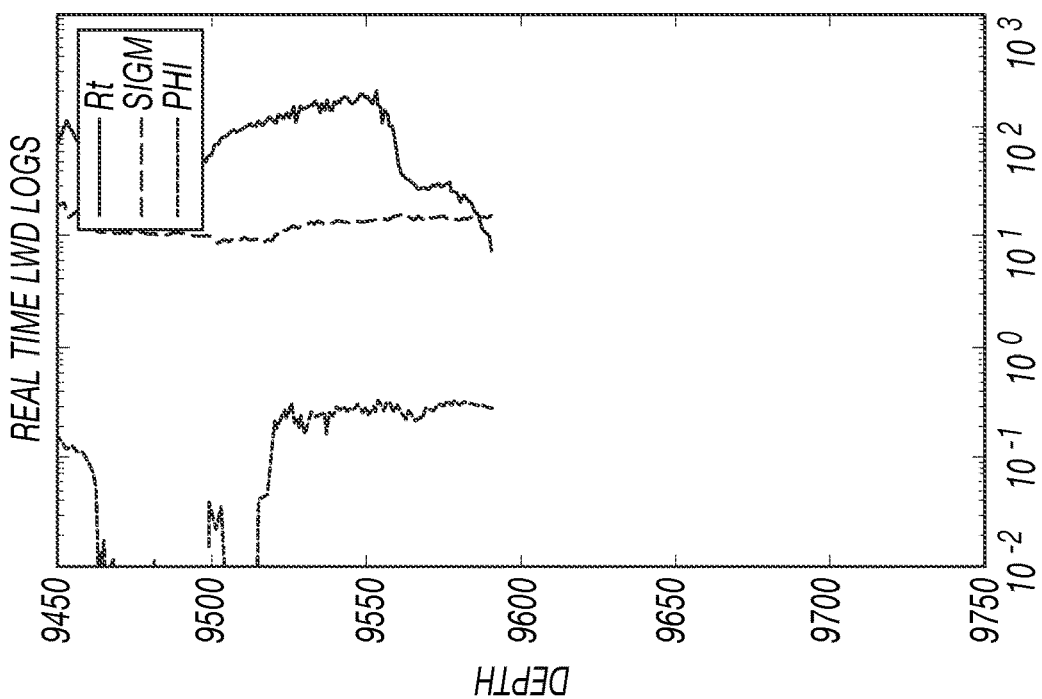
FIG. 10 shows the resistivity, the matrix capture cross section, and the porosity logs as a real-time answer product, in accordance with one embodiment in the present disclosure.

A crossplot can also be used for job planning. One can enter a resistivity value and observe the dynamic range of the sigma value, as shown in FIG. 9. Because the sigma precision is about 0.5 capture units ("cu", that is, the noise level), the crossplot shows that for a resistivity of 10 ohm-m, the technique can resolve a salinity range between 30 ppk and 200 ppk, but for a resistivity of 100 ohm-m, it cannot resolve the salinity. Thus, the crossplots can be used to validate (or invalidate) the application from input values of resistivity and Sigma.

Figure 12:
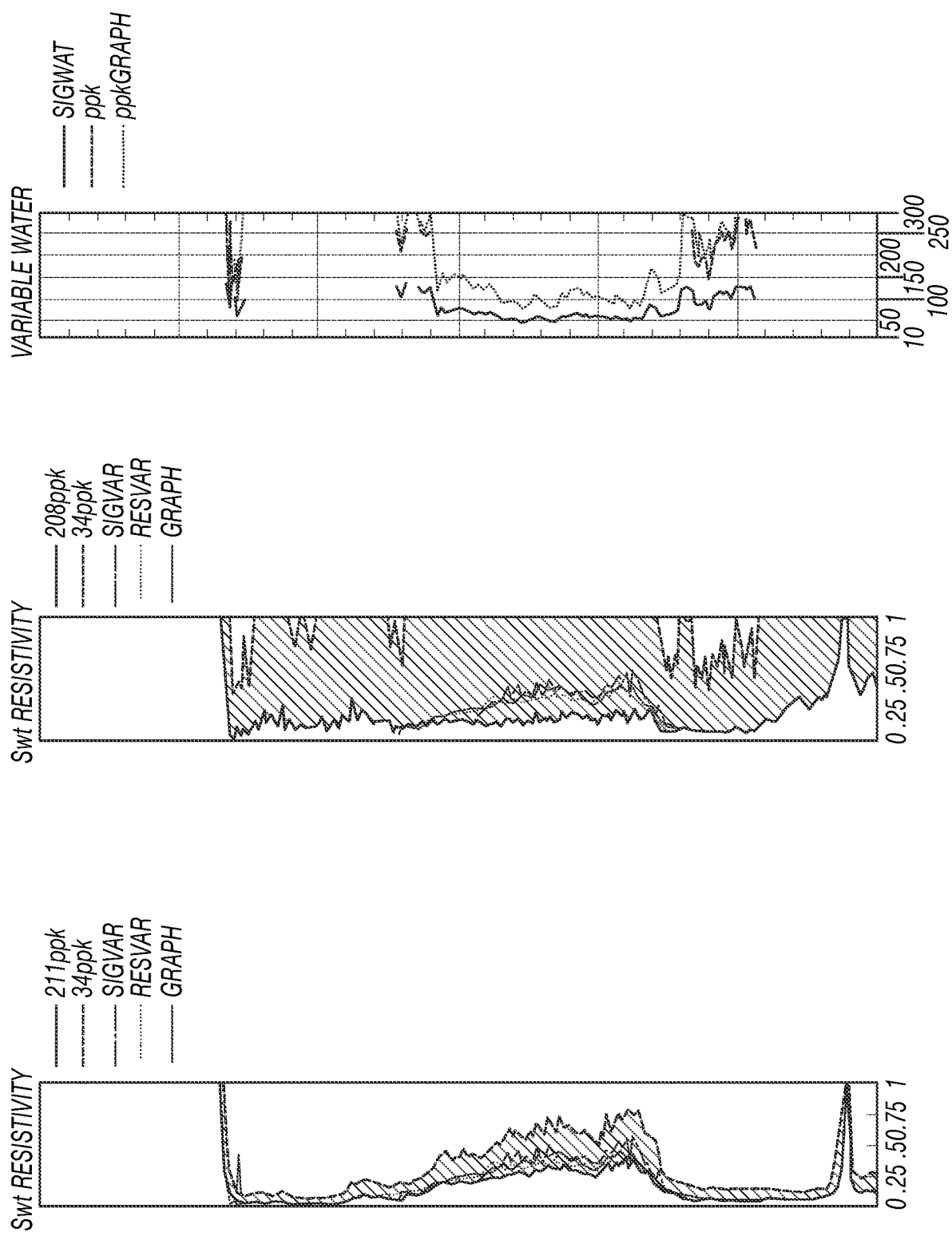
FIG. 12 is a set of various logs showing a comparison of a graphical solution versus a numerical solution, in accordance with one embodiment in the present disclosure.

The inverse solutions of water salinity and saturation can also be obtained by a purely graphical method, that is, by building a very dense grid of equi-salinity lines and equi-saturation lines, and interpolating between them to form a continuous surface of solution S (R, $\Sigma$) that returns a pair of salinity-saturation values for an input pair of resistivity-sigma values. The graphical method is complementary to the numerical method that might be locked into a local minimum. FIG. 12 shows a comparison of graphical versus numerical solutions. The graphical technique gives an independent verification of the numerical solution.

Figure 13B:
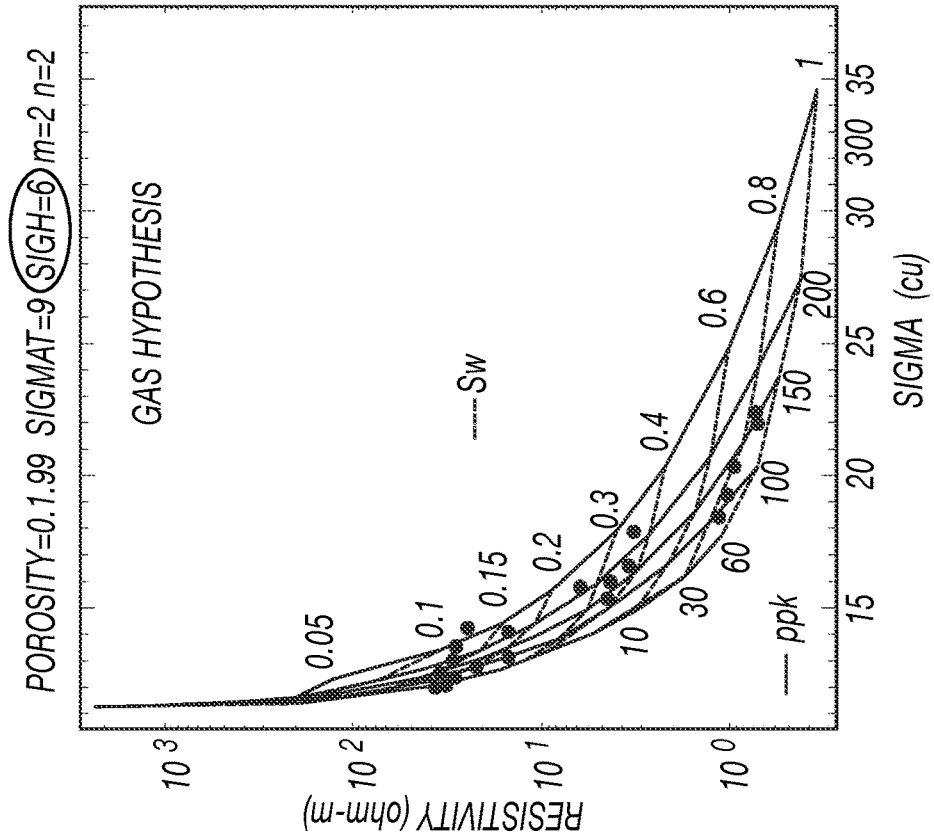
FIGS. 13A and 13B are crossplots showing how hydrocarbon typing may be performed, in accordance with one embodiment in the present disclosure.
Figure 13A:
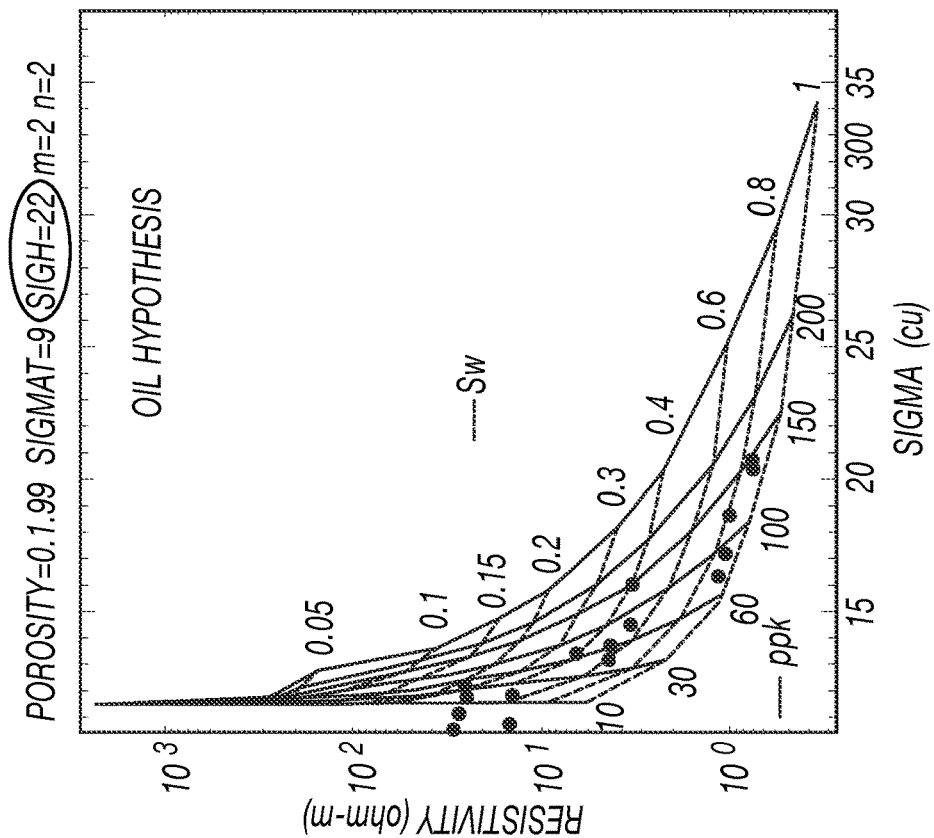

In another embodiment, one can use crossplots to distinguish oil from gas (i.e., perform hydrocarbon typing). FIG. 13A shows that a $\Sigma_w$-ppk overlay built with an assumed hydrocarbon being oil does not account for the data with high resistivity. That indicates the hydrocarbon type is gas. The $\Sigma_w$-ppk overlay built with the hypothesis of gas covers all the data (FIG. 13B).

A real-time answer product can be captured and plotted at the surface as data is sent uphole using conventional or unconventional telemetry means including, but not limited to, mud pulse, acoustic, and wired drill pipe. Examples of such real-time answer products are shown in FIGS. 8 and 9. Those figures represent "snapshots" of the recorded data at a depth of 9,591 feet indicated in an example wellbore. FIG. 8 shows the resistivity, the matrix thermal neutron capture cross section, and the porosity logs. The "current" data point is shown in the crossplot of FIG. 9. Instead of characterizing the well as penetrating a formation with a capture cross section of 17 cu and 7 ohm-m resistivity, one can state the bottomhole assembly is in a hydrocarbon-bearing reservoir with about 25% water saturation and a formation connate water salinity of 110,000 ppm.

It will be appreciated that the above-described embodiments relate to a numerical solving technique (e.g., for solving Equations 1, 2, and 3 above) as disclosed in the above-referenced U.S. Pat. No. 8,441,269 (the '269 patent). In accordance with aspects of the present disclosure, certain embodiments relate to providing graphical methods to solve for formation parameters using combined logs, such as resistivity and Sigma logs.

Figure 14B:
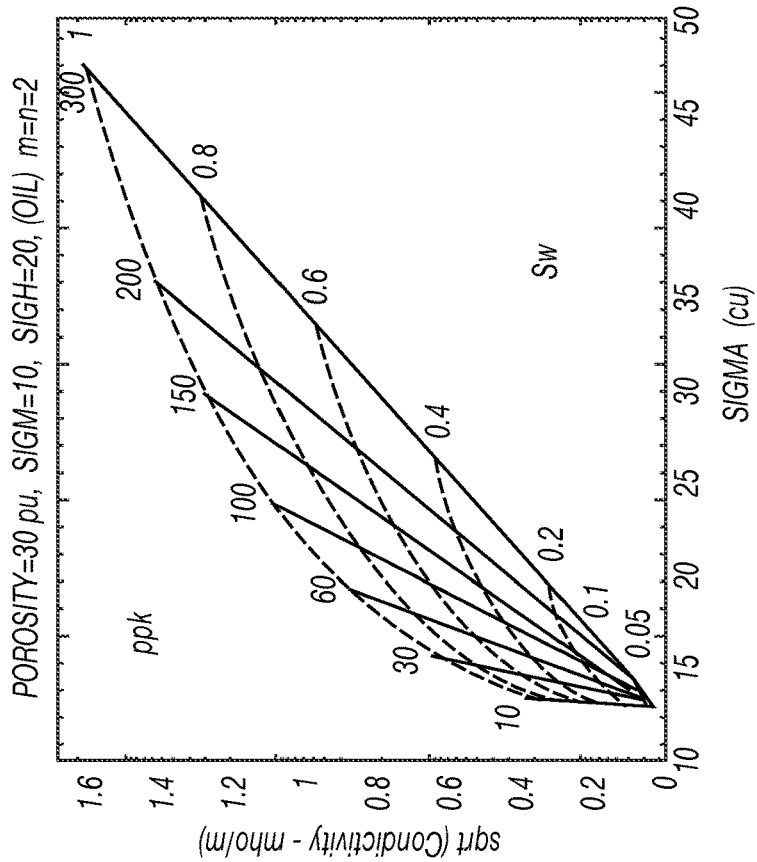
FIG. 14 is a dynamic crossplot of Sigma-resistivity and Sigma-square root of conductivity (sqrC) containing both forward and inverse solutions.
Figure 14A:
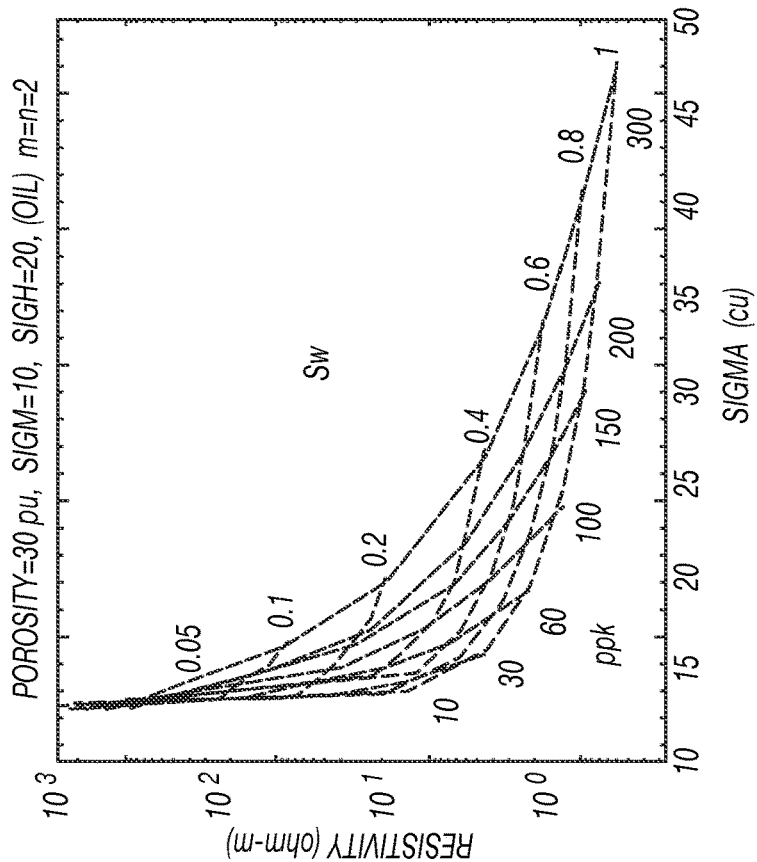
Figure 15:
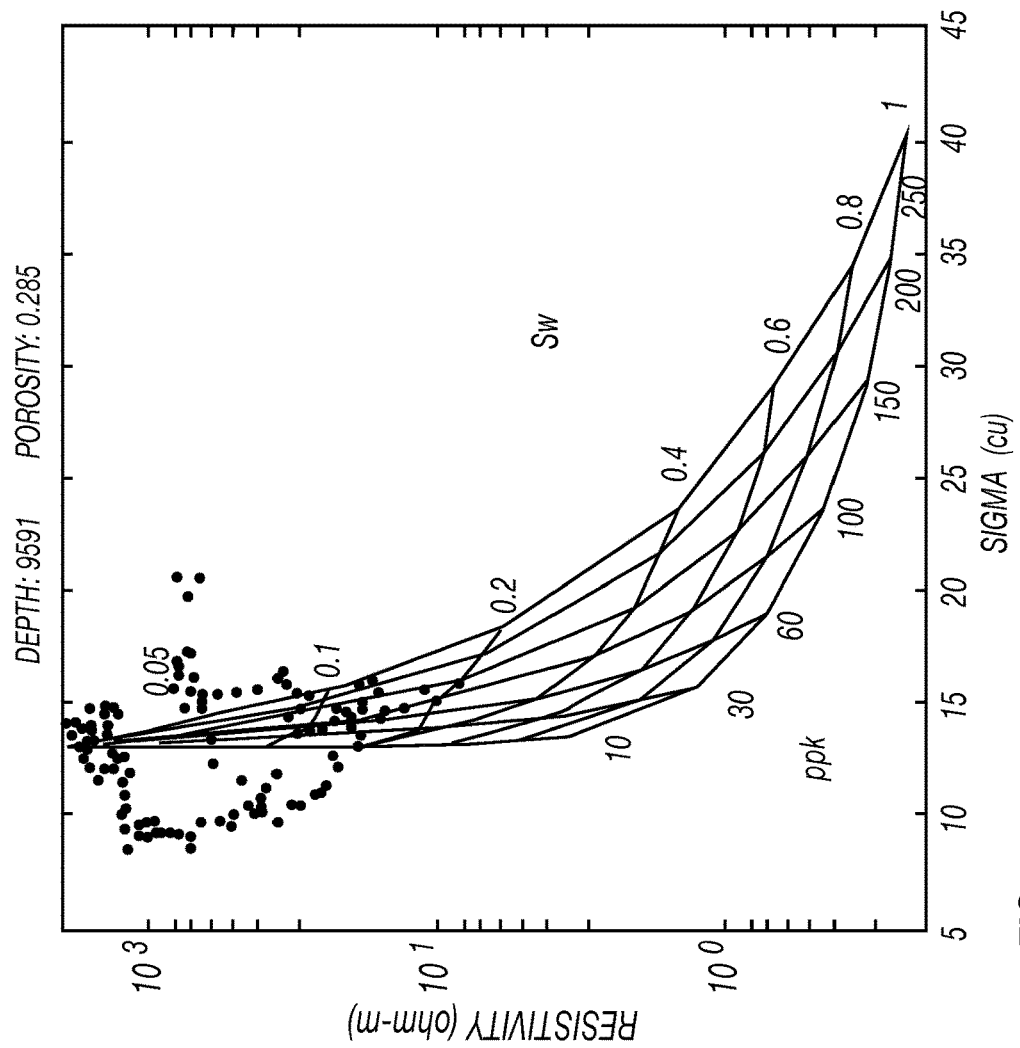
FIG. 15 shows resistivity, Sigma, and porosity logs and a corresponding sigma-resistivity crossplot.
Figure 15:
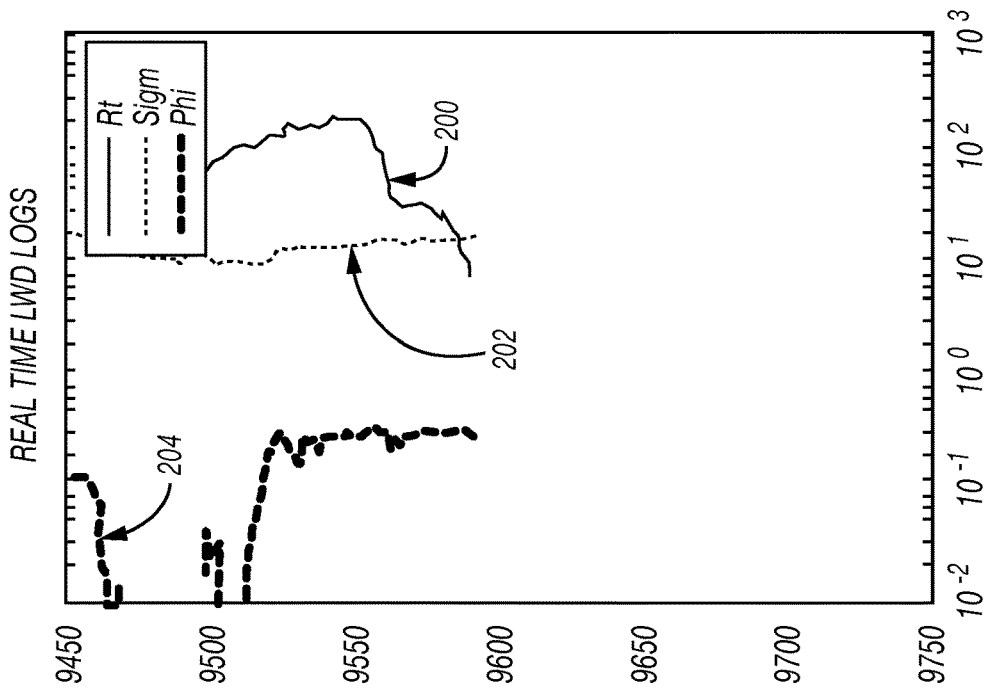
Figure 16:
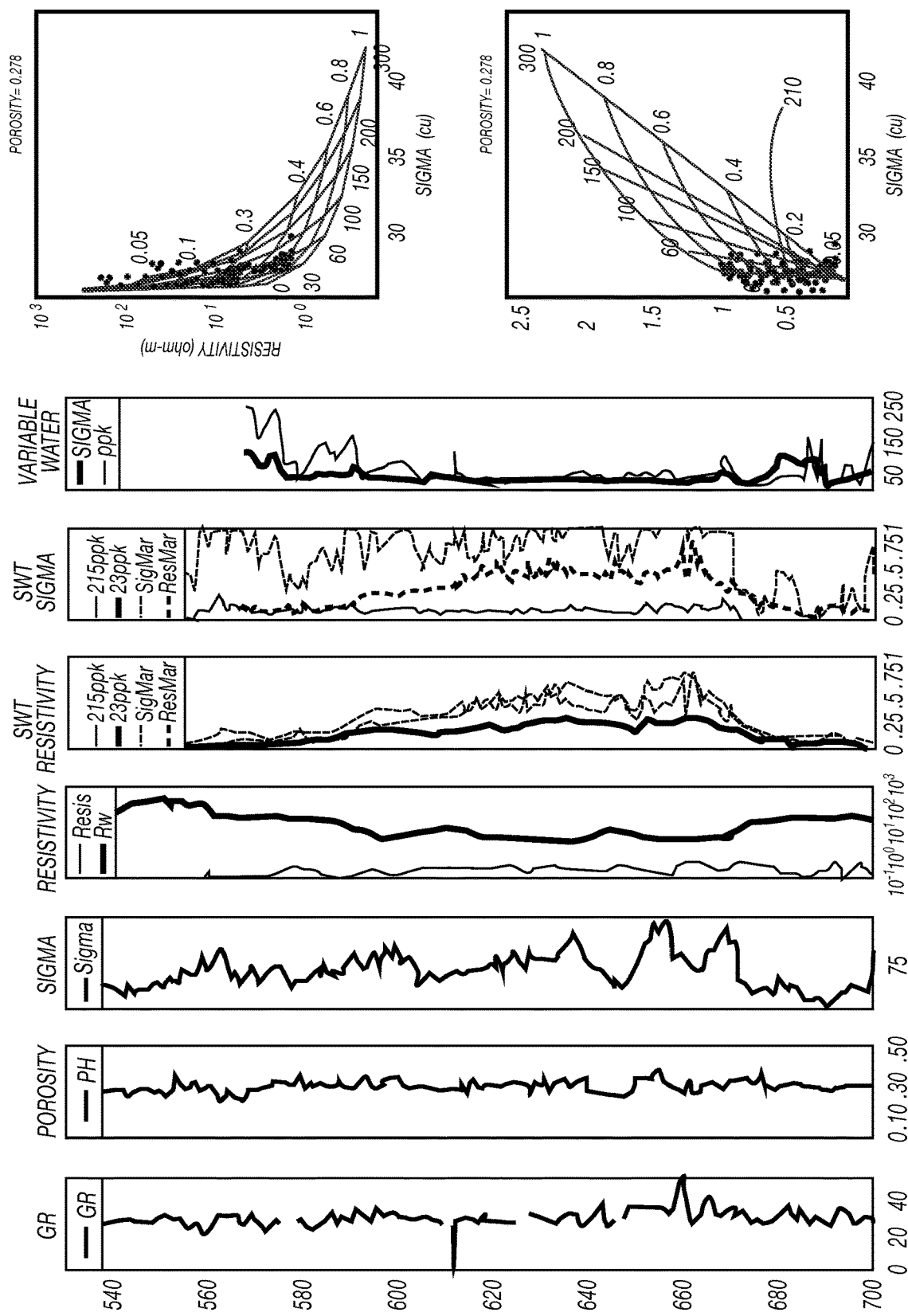
FIG. 16 shows an example of several measurement logs acquired from a well and corresponding Sigma-resistivity and Sigma-sqrC crossplots.

In one embodiment, a graphical solution may be obtained by 1) building a crossplot of resistivity-sigma that spans all ranges of salinity-saturation (grids of solution), 2) plotting the actual data point and 3) interpolating the grids of solution to get the answers (which are the equi-salinity line and equi-saturation line that go through the data point) as shown in FIG. 14, FIG. 15 and FIG. 16. In this example, the input parameters are porosity, sigma matrix, sigma hydrocarbon and an Archie saturation model with its relevant parameters (but no water parameter is needed).

The end result in this example is a crossplot of Sigma-Resistivity. This resulting crossplot is referred to as dynamic because the crossplot overlay changes with porosity, matrix and fluids properties. One feature of the dynamic Sigma-Resistivity crossplot is that it contains both the forward and inverse solutions. For example, FIG. 14 shows dynamic crossplots of Sigma-Resistivity (left) and Sigma-square-root of Conductivity (sqrC) (right). The plots contain both forward and inverse solutions. 'Forward' means that from salinity, saturation, porosity and others formation parameters, synthetic Sigma and Resistivity logs can be predicted. 'Inverse' means that from measured Sigma and Resistivity logs and other formation parameters, water salinity and saturation are determined from the crossplot. Since the square root of conductivity sqrC=sqrt(1/R) is proportional to the water volume, it might be better to crossplot the equivalent Sigma-sqrC to gain more dynamic range as seen in FIG. 14. Another feature is that resulting crossplot contains the domain of data and answers from the petrophysics viewpoint—that could be used for quality control purposes. Finally, it contains petrophysical insights that a set of equations, i.e., solved numerically for instance, does not.

Real Time Answers

In an actual well log data example provided below, real-time answers are captured and plotted as data were communicated from the instruments in the wellbore to the control system as shown in FIG. 1. Specifically, FIG. 15 shows well logs at a depth of about 9591 feet showing Resistivity (200), Sigma (202), and Porosity (204) curves on the left. The current data point is shown by a circle on the crossplot at the right. Instead of indicating the well is penetrating a formation with 17 cu sigma and 7 ohm·m resistivity, in the present example the data may be presented in the form of the BHA being in a hydrocarbon-bearing formation with about 25% $S_w$ and 110,000 ppm connate water salinity.

Recorded Memory Answers

Because of the limitations of surface to wellbore telemetry used in MWD/LWD systems such as shown in FIG. 1, data and calculations recorded in data storage in the one or more modules (e.g., 120, 120A, 130 in FIG. 1) may be more complete, as may be observed in FIG. 16. Specifically, FIG. 16 are recorded (stored in memory and later accessed when the MWD/LWD tools are retrieved to the surface) calculations showing new logs of $R_w$ (track 4), water saturation (tracks 5 and 6), and water salinity (track 7) that are consistent with both resistivity and Sigma measurements in an oil field flooded with sea water. The current data point is shown by the horizontal bar in the depth log, and the square point (210) on the crossplot. It can be observed that good porosity data fall within the boundaries of the ppk-$S_w$ overlay.

Porosity, Lithology, m Invariant Crossplots or Static Crossplots

Figure 17:
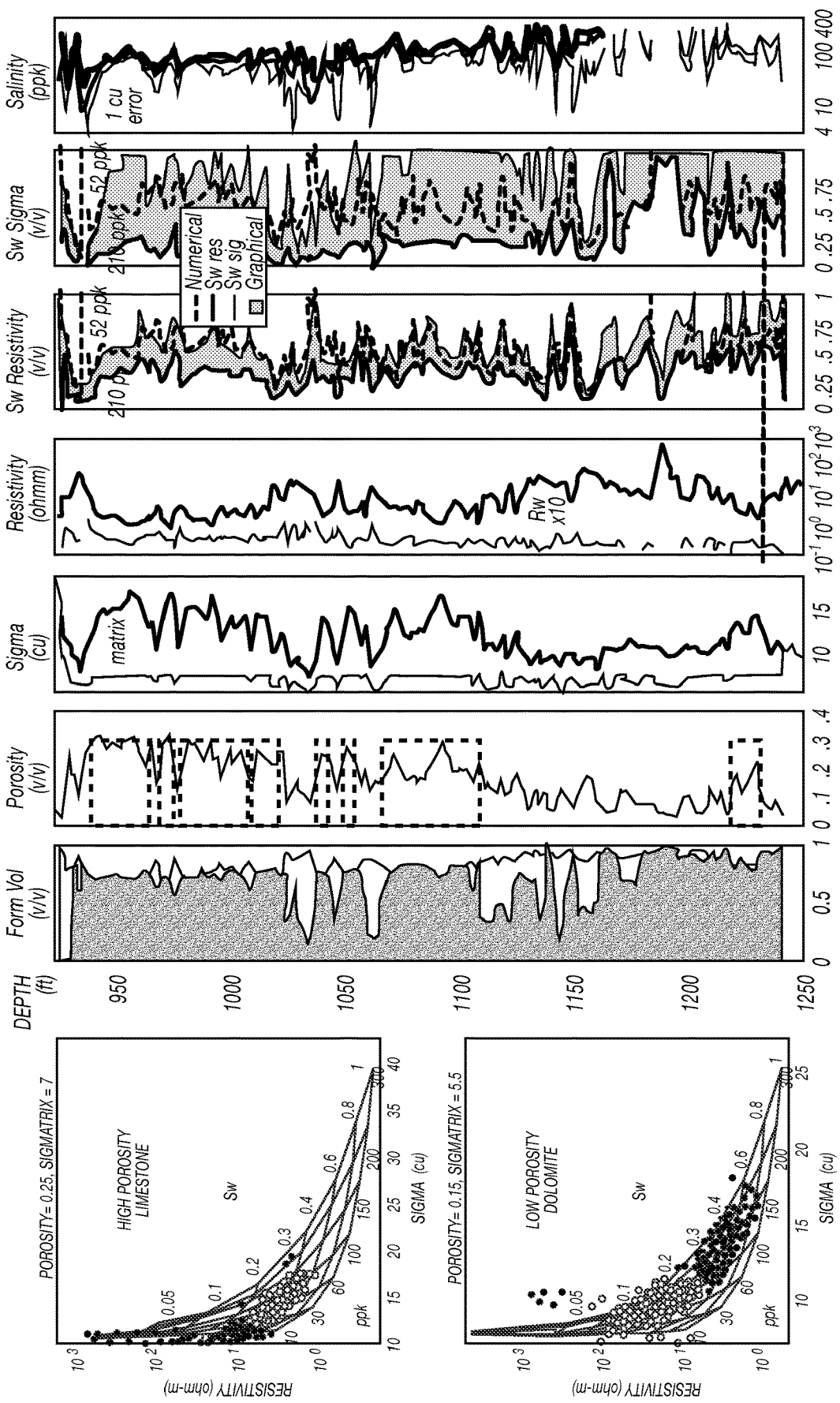
FIG. 17 shows an example resistivity-Sigma crossplot that is not well suited for interpretation due to varying lithology and porosity.
Figure 18:
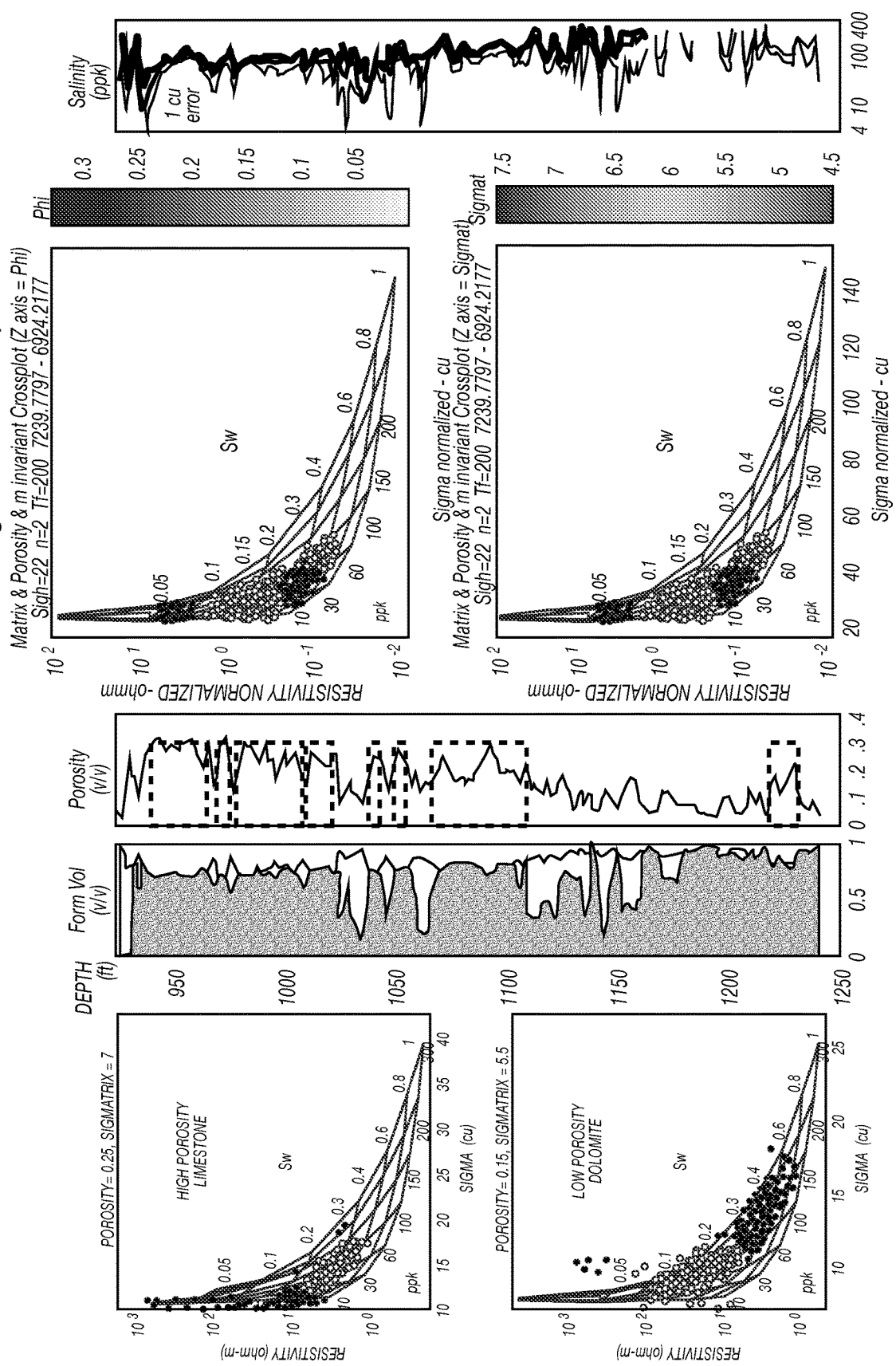
FIG. 18 shows an example resistivity-Sigma crossplot that is better suited (compared to FIG. 17) for interpretation regardless of varying lithology and porosity.

In examples shown in FIGS. 17 and 18, crossplots in the form of "boomerangs" (as described above) are constructed for specific formation porosity, rock matrix mineralogy (mineral composition), hydrocarbon type, and Archie's m and n parameters. FIG. 17 shows an example of a Resistivity-Sigma crossplot that is not well suited to be used for interpretation because of varying lithology and porosity. As can be observed in FIG. 17, the top left crossplot covers the high porosity limestone but not the low porosity dolomite. The bottom left crossplot covers the low porosity dolomite but not the high porosity limestone. FIG. 18 shows an example of lithology/porosity invariant Resistivity-Sigma crossplots. In FIG. 18, the right hand side crossplots use "normalized" Sigma as in Equation 4 and "normalized" Resistivity as in Equation 5 (equations 4 and 5 are shown below), instead of the raw Sigma and Resistivity measurements used in the left hand side crossplots. As such, interpolation of the grids of salinity-saturation may be performed from a data point in a single crossplot. Here, the top right crossplot has coded porosity values along the Z-axis to track porosity variation. The bottom right crossplot has coded sigma matrix in Z-axis to track lithology variation.

This approach intertwines porosity and lithology variations on one hand, and water saturation and salinity variations on the other hand. When using a single boomerang crossplot over a large depth interval that includes rapid lithology/porosity changes, the crossplot may not fit all data points. In this case, a new and improved boomerang crossplot overlay is introduced in accordance with aspects of the present disclosure that is better suited for rapidly changing porosity and lithology environments. This new overlay depends on the Archie parameter n and the hydrocarbon type.

Referring to the Equations 1 and 2 above, rearrangement of these equations to keep measurable variables on the left side results in Equations 4 and 5 below:

$$\frac{\Sigma - (1-\phi) \cdot \Sigma_m}{\phi} = Sw \cdot \Sigma_w + (1-Sw) \cdot \Sigma_{hc} \quad (4)$$

$$Rt \cdot \phi^m = \frac{a \cdot Rw}{Sw^n} \quad (5)$$

This transformation of the crossplot x, y coordinates groups the varying input (i.e., logs of sigma, resistivity, porosity, lithology etc.), thus removing their variability from the varying output of salinity, saturation (in the form of the overlay). The application of these new overlays to various LWD data sets has demonstrated excellent interpretation quality control, since all data points are now contained within the boomerang area (FIG. 18), and also improved results, since $S_w$ and salinity can now be read correctly from the cross-plot irrespective of lithology or porosity variations (FIG. 18)

To further aid the interpretation, variants of the boomerangs were offered with a z-axis color scale (FIG. 18). In carbonates, it was found that putting a sigma matrix or photoelectric factor (Pef) on the Z-axis allows salinity/saturation changes to be distinguished in various limestone, dolomite and anhydrite mineral formations. In clastic (principally quartz mineral composition) formations putting shale fractional volume (Vsh) on the Z-axis can help to highlight the most productive formations (those being relatively low Vsh). Finally, to help visualize porosity variations, one may vary the data point dot size as a function of its effective porosity. This way, points with zero or little effective porosity, such as in anhydrite or shale beds which are of little petrophysical interest, do not obscure more interesting data points. Points with high effective porosity are plotted with large dots to highlight the more productive zones.

In further embodiments, Equations 4 and 5 may also be extended to the case where both gas and oil hydrocarbon types are present simultaneously inside the pore system, in which case they can be written as Equations 6 and 7 below:

$$\frac{\Sigma - (1-\phi)\cdot \Sigma_m}{\phi} - S_{gas}\cdot \Delta\Sigma_{gas} = S_w \cdot \Sigma_w + (1-S_w)\cdot \Sigma_{hc} \quad (6)$$

$$Rt\cdot \phi^m = \frac{a\cdot Rw}{Sw^n} \quad (7)$$

where $S_{gas}$ is the gas saturation, and $\Delta\tau_{gas}$ is the difference between the gas and liquid hydrocarbon Sigma. For instance, this can be extended to cover instances where there is kerogen/tar/heavy oil/volatile oil/condensate gas (which are common in unconventional applications).

In the foregoing equations, the volume or saturation of the gas phase may be directly estimated from the porosity deficit between a matrix-corrected density porosity and neutron porosity, or a matrix-corrected density porosity and NMR porosity.

As will be understood, the various techniques described above are provided as example embodiments. Accordingly, it should be understood that the present disclosure should not be construed as being limited to only the examples provided above. Further, it should be appreciated that the techniques disclosed herein may be implemented in any suitable manner, including hardware (suitably configured circuitry), software (e.g., via a computer program including executable code stored on one or more tangible computer readable medium), or via using a combination of both hardware and software elements. Further, it is understood that the techniques described herein may be implemented on a downhole processor (e.g., a processor that is part of a logging tool), such that the processing is performed downhole, with the results sent to the surface by any suitable telemetry technique. Additionally, in other embodiments, tool measurements may be transmitted uphole via telemetry, and the techniques described herein may be performed at the surface on a computer system (e.g., one that is part of control system 152 in FIG. 1).

The specific embodiments described above are only examples, and it will be appreciated that many modifications and other embodiments will come to the mind of one skilled in the art having the benefit of the foregoing description and the associated drawings. Accordingly, it is understood that various modifications and embodiments are intended to be included within the scope of the appended claims.

What is claimed is:

1. A method for estimation of water properties in a subsurface formation comprising:
   acquiring, via a computing system, a plurality of well log measurements of different measurement types from the subsurface formation as measured by one or more downhole tools positioned in the subsurface formation;
   parameterizing, via the computing system, the water properties and formation properties with respect to a selected set of the different measurement types for at least two different lithologies that comprise corresponding ranges of porosity; and
   rendering to a display, via the computing system, a two-dimensional graphic representation of the parameterized water properties and the parameterized formation properties to define a boomerang area that encompasses the ranges of porosity and that comprises indicia of at least one of porosity variation within the boomerang area and a corresponding porosity scale and lithology variation within the boomerang area and a corresponding lithology scale to, via at least a portion of the well log measurements, generate an estimate of the water properties and at least one of porosity variation and lithology variation in the subsurface formation.

2. The method of claim 1, wherein the plurality of well log measurements comprises resistivity measurements, thermal neutron capture cross-section (Sigma) measurements, density, and a hydrogen index.

3. The method of claim 1, wherein the water properties are parameterized with respect to salinity.

4. The method of claim 1 wherein the formation properties comprise water volume in the subsurface formation.

5. The method of claim 1 wherein the formation properties comprise hydrocarbon volume in the subsurface formation.

6. The method of claim 1 wherein the two-dimensional graphic representation comprises a graph of resistivity with respect to thermal neutron capture cross-section corrected for formation mineral composition of at least two of the at least two different lithologies.

7. The method of claim 6 wherein the formation mineral composition comprises at least one of limestone, dolomite and anhydrite.

8. The method of claim 6 wherein the formation mineral composition comprises quartz.

9. The method of claim 8 wherein the formation mineral composition is corrected for fractional volume of shale.

10. The method of claim 1 wherein the two-dimensional graphic representation comprises color and wherein the porosity scale comprises color, the lithology scale comprises color or the porosity scale comprises color and the lithology scale comprises color.

11. A system comprising:
    a processor;
    a plurality of well logging sensors each measuring a different physical parameter of a subsurface formation at a plurality of depths of investigation from a wall of a wellbore; and
    a display operatively coupled to the processor for graphically displaying a two-dimensional graphic of parameterized water properties and parameterized formation properties to define a boomerang area that encompasses ranges of porosity of at least two different lithologies and that comprises indicia of at least one of porosity variation within the boomerang area and a corresponding porosity scale and lithology variation within the boomerang area and a corresponding lithology scale to, via measurements of the well logging sensors, estimate water properties and at least one of porosity variation and lithology variation of the subsurface formation.

12. The system of claim 11 wherein the graphically displaying comprises displaying a graph of resistivity with respect to thermal neutron capture cross-section.

13. The system of claim 11 wherein the graphically displaying comprises displaying a graph of resistivity with respect to thermal neutron capture cross-section corrected for formation mineral composition of at least two of the at least two different lithologies.

14. The system of claim 13 wherein the formation mineral composition comprises at least one of limestone, dolomite and anhydrite.

15. The system of claim 13 wherein the formation mineral composition comprises quartz.

16. The system of claim 15 wherein the formation mineral composition is corrected for fractional volume of shale.

17. The system of claim 11 wherein the plurality of well logging sensors are disposed in at least one drill collar forming part of a drill string.

18. The system of claim 11 further comprising a telemetry transmitter for communicating measurements made by the plurality of well logging sensors to the surface during drilling or a wellbore.

19. The system of claim 18 further comprising a data storage device disposed in at least one drill collar of a drill string in signal communication with the plurality of well logging sensors, the data storage device interrogatable when the drill string is removed from the wellbore.

20. One or more non-transitory computer-readable media comprising computer-executable instructions executable to instruct a computing system to:

acquire, via the computing system, a plurality of well log measurements of different measurement types from the subsurface formation as measured by one or more downhole tools positioned in the subsurface formation;

parameterize, via the computing system, the water properties and formation properties with respect to a selected set of the different measurement types for at least two different lithologies that comprise corresponding ranges of porosity; and render to a display, via the computing system, a two-dimensional graphic representation of the parameterized water properties and the parameterized formation properties to define a boomerang area that encompasses the ranges of porosity and that comprises indicia of at least one of porosity variation within the boomerang area and a corresponding porosity scale and lithology variation within the boomerang area and a corresponding lithology scale to, via at least a portion of the well log measurements, generate an estimate of the water properties and at least one of porosity variation and lithology variation in the subsurface formation.

* * * * *